US011687571B2

(12) United States Patent
Doyle et al.

(10) Patent No.: US 11,687,571 B2
(45) Date of Patent: *Jun. 27, 2023

(54) INTERACTIVE LINEAGE ANALYZER FOR DATA ASSETS

(71) Applicant: Tableau Software, LLC, Seattle, WA (US)

(72) Inventors: Tyler James-Buker Doyle, Seattle, WA (US); Graeme Riley Britz, Seattle, WA (US); Jonathan Joseph Bryak, Bothell, WA (US); Cassius David Butcher, Seattle, WA (US); Jun Ho Kim, Sammamish, WA (US); Jiyoung Oh, San Carlos, CA (US)

(73) Assignee: Tableau Software, LLC, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/542,148

(22) Filed: Dec. 3, 2021

(65) Prior Publication Data

US 2022/0092090 A1 Mar. 24, 2022

Related U.S. Application Data

(63) Continuation of application No. 16/389,389, filed on Apr. 19, 2019, now Pat. No. 11,194,845.

(51) Int. Cl.
*G06F 16/245* (2019.01)
*G06F 16/26* (2019.01)
*G06F 16/28* (2019.01)

(52) U.S. Cl.
CPC .......... *G06F 16/289* (2019.01); *G06F 16/245* (2019.01); *G06F 16/26* (2019.01)

(58) Field of Classification Search
None
See application file for complete search history.

(56) References Cited

U.S. PATENT DOCUMENTS 5,550,971 A 8/1996 Brunner et al.
5,689,711 A 11/1997 Bardasz et al.
(Continued)

FOREIGN PATENT DOCUMENTS

WO 2006060773 A2 6/2006

OTHER PUBLICATIONS

International Search Report and Written Opinion for International Patent Application No. PCT/US2020/028163 dated Jul. 21, 2020, pp. 1-7.

(Continued)

*Primary Examiner* — Scott A. Waldron
(74) *Attorney, Agent, or Firm* — John W. Branch; Branch Partners PLLC

(57) ABSTRACT

Embodiments are directed to managing a data model that includes data objects associated with layers of the data model may be provided. A lineage model that includes lineage objects that has one or more lineage objects associated with a layer may be provided. A lineage object associated with a layer may be activated. A first portion data objects may be determined based on the activated lineage object. An anchor object may be determined from the first portion of data objects. A search of the data model may be employed to provide dependency information based on a position of the anchor data object in the data model. A second portion of data objects may be determined based on the dependency information. A report that includes a list of the second portion of data objects, the dependency information, or the like, may be provided.

20 Claims, 13 Drawing Sheets

(56) References Cited

U.S. PATENT DOCUMENTS

| | | |
|---|---|---|
| 8,286,087 B1 | 10/2012 | Xian et al. |
| 9,383,913 B2 | 7/2016 | Hoyer et al. |
| 9,489,119 B1 | 11/2016 | Smith, Jr. |
| 9,760,240 B2 | 9/2017 | Maheshwari et al. |
| 9,881,066 B1 | 1/2018 | Yousaf et al. |
| 10,275,265 B1 | 4/2019 | Gould et al. |
| 10,445,170 B1 | 10/2019 | Subramanian et al. |
| 10,705,695 B1 | 7/2020 | Porath et al. |
| 10,783,162 B1 | 9/2020 | Montague et al. |
| 2004/0205562 A1 | 10/2004 | Rozek et al. |
| 2006/0064674 A1 | 3/2006 | Olson, Jr. et al. |
| 2008/0126987 A1 | 5/2008 | Meschian et al. |
| 2009/0006939 A1 | 1/2009 | DeSpain et al. |
| 2009/0007122 A1 | 1/2009 | Peyton et al. |
| 2009/0012983 A1* | 1/2009 | Senneville ............ G06F 16/256 |
| 2010/0114629 A1 | 5/2010 | Adler et al. |
| 2010/0138420 A1 | 6/2010 | Bator et al. |
| 2010/0235771 A1 | 9/2010 | Gregg, III |
| 2010/0313157 A1 | 12/2010 | Carlsson et al. |
| 2010/0318583 A1 | 12/2010 | Cohen |
| 2011/0219321 A1 | 9/2011 | Gonzalez Veron et al. |
| 2012/0311497 A1 | 12/2012 | Bear et al. |
| 2014/0026084 A1 | 1/2014 | Gilboa |
| 2014/0058789 A1 | 2/2014 | Doehring et al. |
| 2014/0074888 A1 | 3/2014 | Potter et al. |
| 2014/0114907 A1 | 4/2014 | Kozina et al. |
| 2014/0215405 A1 | 7/2014 | Breedvelt-Schouten |
| 2014/0267287 A1 | 9/2014 | Dodgen et al. |
| 2014/0330821 A1 | 11/2014 | Tullis et al. |
| 2014/0372956 A1 | 12/2014 | Bisca et al. |
| 2015/0112998 A1 | 4/2015 | Shankar et al. |
| 2015/0339263 A1 | 11/2015 | Abu El Ata et al. |
| 2015/0347091 A1 | 12/2015 | Ferko et al. |
| 2016/0078361 A1 | 3/2016 | Brueckner et al. |
| 2016/0103908 A1 | 4/2016 | Fletcher et al. |
| 2016/0224532 A1 | 8/2016 | Miller et al. |
| 2016/0224616 A1 | 8/2016 | Beacom et al. |
| 2016/0232207 A1 | 8/2016 | Brunel et al. |
| 2016/0314605 A1 | 10/2016 | Filippi et al. |
| 2017/0010787 A1 | 1/2017 | Ranganathan et al. |
| 2017/0075557 A1 | 3/2017 | Noble et al. |
| 2017/0091317 A1 | 3/2017 | Cummings et al. |
| 2017/0102694 A1 | 4/2017 | Enver et al. |
| 2017/0103103 A1 | 4/2017 | Nixon et al. |
| 2017/0140068 A1 | 5/2017 | Oh et al. |
| 2017/0154088 A1 | 6/2017 | Sherman |
| 2017/0161188 A1 | 6/2017 | Isoi |
| 2017/0177681 A1 | 6/2017 | Potiagalov et al. |
| 2017/0177744 A1 | 6/2017 | Potiagalov et al. |
| 2017/0178368 A1 | 6/2017 | Noon et al. |
| 2017/0193049 A1 | 7/2017 | Grehant |
| 2017/0213131 A1 | 7/2017 | Hammond et al. |
| 2017/0220633 A1 | 8/2017 | Porath et al. |
| 2017/0286526 A1 | 10/2017 | Bar-Or et al. |
| 2017/0293666 A1 | 10/2017 | Ragavan et al. |
| 2017/0316355 A1 | 11/2017 | Shrestha et al. |
| 2018/0024731 A1 | 1/2018 | Sanches et al. |
| 2018/0067998 A1 | 3/2018 | Sherman et al. |
| 2018/0129369 A1 | 5/2018 | Kim et al. |
| 2018/0157702 A1 | 6/2018 | Clemens et al. |
| 2018/0218050 A1 | 8/2018 | Porath et al. |
| 2018/0260106 A1 | 9/2018 | Leonard et al. |
| 2018/0260903 A1 | 9/2018 | Callery |
| 2019/0034489 A1 | 1/2019 | Ziegler |
| 2019/0095395 A1 | 3/2019 | Piecko |
| 2019/0188308 A1 | 6/2019 | Simon et al. |
| 2019/0286668 A1 | 9/2019 | Puzicha et al. |
| 2019/0294720 A1 | 9/2019 | Beringer et al. |
| 2019/0325292 A1 | 10/2019 | Remis et al. |
| 2019/0332599 A1 | 10/2019 | Woo |
| 2019/0384836 A1 | 12/2019 | Roth et al. |
| 2020/0104401 A1 | 4/2020 | Burnett et al. |
| 2020/0104402 A1 | 4/2020 | Burnett et al. |
| 2020/0175006 A1 | 6/2020 | Hughes |
| 2020/0285803 A1 | 9/2020 | Edge et al. |
| 2020/0334277 A1 | 10/2020 | Doyle et al. |
| 2020/0372057 A1 | 11/2020 | Tonkin et al. |
| 2020/0401623 A1 | 12/2020 | Dilts et al. |
| 2021/0263900 A1 | 8/2021 | Joyce et al. |
| 2021/0390420 A1 | 12/2021 | Barnett |
| 2022/0113150 A1 | 4/2022 | Hidayat et al. |

OTHER PUBLICATIONS

Office Communication for U.S. Appl. No. 16/389,389 dated May 13, 2021, pp. 1-16.
Office Communication for U.S. Appl. No. 16/389,389 dated Aug. 18, 2021, pp. 1-9.
International Search Report and Written Opinion for International Patent Application No. PCT/US2022/031195 dated Aug. 31, 2022, pp. 1-12.
International Search Report and Written Opinion for International Patent Application No. PCT/US2022/038328 dated Nov. 30, 2022, pp. 1-12.
Pienta, Robert et al., "VISAGE: Interactive Visual Graph Querying," AVI '16, Jun. 7-10, 2016, Bari Italy, pp. 272-279.
Von Landesberger, Tatiana et al., "A System for Interactive Visual Analysis of Large Graphs Using Motifs in Graph Editing and Aggregation," VMV 2009, pp. 1-9.
Office Communication for U.S. Appl. No. 16/586,554 dated Jul. 24, 2020, pp. 1-27.
Office Communication for U.S. Appl. No. 16/586,554 dated Nov. 24, 2020, pp. 1-28.
Office Communication for U.S. Appl. No. 16/586,554 dated Feb. 16, 2021, pp. 1-7.
Office Communication for U.S. Appl. No. 16/586,554 dated Apr. 2, 2021, pp. 1-37.
Office Communication for U.S. Appl. No. 16/725,986 dated Apr. 2, 2021, pp. 1-23.
Papenbrock, Thorsten et al., "Data-driven Schema Normalization," in Proceedings of the 20th International Conference on Extending Database Technology, 2017, pp. 342-353.
Brunel, Robert et al., "Supporting Hierarchical Data in SAP HANA," 2015 IEEE 31st International Conference on Data Engineering (ICDE), 2015, pp. 1-12.
Office Communication for U.S. Appl. No. 16/984,014 dated Aug. 10, 2021, pp. 1-32.
Furmanova, Katarina et al., "Taggle: Scalable Visualization of Tabular Data through Aggregation," IEEE Transactions on Visualization and Computer Graphics, 2017, pp. 1-14.
Office Communication for U.S. Appl. No. 16/586,554 dated Sep. 27, 2021, pp. 1-45.
Office Communication for U.S. Appl. No. 16/725,986 dated Sep. 30, 2021, pp. 1-10.
Office Communication for U.S. Appl. No. 17/091,536 dated Nov. 5, 2021, pp. 1-25.
Office Communication for U.S. Appl. No. 16/944,043 dated Nov. 26, 2021, pp. 1-49.
Office Communication for U.S. Appl. No. 16/586,554 dated Dec. 15, 2021, pp. 1-7.
Office Communication for U.S. Appl. No. 16/984,014 dated Jan. 3, 2022, pp. 1-31.
Office Communication for U.S. Appl. No. 16/586,554 dated Feb. 24, 2022, pp. 1-47.
Office Communication for U.S. Appl. No. 16/984,014 dated Mar. 18, 2022, pp. 1-5.
Office Communication for U.S. Appl. No. 16/944,043 dated Apr. 19, 2022, pp. 1-10.
Office Communication for U.S. Appl. No. 16/984,014 dated Apr. 20, 2022, pp. 1-33.
Office Communication for U.S. Appl. No. 17/091,536 dated Apr. 25, 2022, pp. 1-32.
Office Communication for U.S. Appl. No. 17/091,536 dated Jul. 7, 2022, pp. 1-5.
Office Communication for U.S. Appl. No. 17/091,536 dated Aug. 16, 2022, pp. 1-38.
Gillis, Alexander S. et al., "What is integrated development environment (IDE)?—Definition from WhatIs.com," Sep. 2018, TechTarget,

(56) References Cited

OTHER PUBLICATIONS https://www.techtarget.com/searchsoftwarequality/definition/integrated-development-environment, Accessed: Aug. 16, 2022, pp. 1-4.
Office Communication for U.S. Appl. No. 16/586,554 dated Aug. 17, 2022, pp. 1-56.
Office Communication for U.S. Appl. No. 17/370,367 dated Sep. 1, 2022, pp. 1-13.
International Search Report and Written Opinion for International Patent Application No. PCT/US2022/034283 dated Oct. 27, 2022, pp. 1-12.
Office Communication for U.S. Appl. No. 16/586,554 dated Nov. 21, 2022, pp. 1-6.
Office Communication for U.S. Appl. No. 16/586,554 dated Jan. 5, 2023, pp. 1-24.
Office Communication for U.S. Appl. No. 17/370,367 dated Jan. 27, 2023, pp. 1-14.
Office Communication for U.S. Appl. No. 17/409,299 dated Feb. 14, 2023, pp. 1-28.
Bauer, Reinhard et al., "The Shortcut Problem—Complexity and Algorithms," Journal of Graph Algorithms and Applications, Aug. 2012, vol. 16, No. 2, pp. 447-481.
Hesse, William, "Directed Graphs Requiring Large Numbers of Shortcuts," in Proceedings of the Fourteenth Annual ACM-SIAM Symposium on Discrete Algorithms, Jan. 2003, pp. 665-669.
Office Communication for U.S. Appl. No. 16/586,554 dated Jul. 25, 2020, pp. 1-27.
Office Communication for U.S. Appl. No. No. 16/586,554 dated Nov. 24, 2020, pp. 1-28.
Office Communication for U.S. Appl. No. 16/586,554 dated Feb. 16, 2021, pp. 1-17.

\* cited by examiner ions to represent data may enable organizations to improve their understanding of business operations, sales, customer information, employee information, key performance indicators, or the like. In some cases, sophisticated visualizations may incorporate or otherwise depend on data from a variety of sources within an organization, including different databases. In some cases, there may be many different visualizations may depend on these varied or disparate data sources. Accordingly, even seemingly minor changes made to databases or other data providers may have a wide-spread impact on one or more visualizations or applications that are currently in use. In some cases, determining the impact of data changes (e.g., modifying column of a database table) may be difficult because, in some circumstances, determining which end-user applications may be impacted by a change may be difficult. Thus, it is with respect to these considerations and others that the present invention has been made.

INTERACTIVE LINEAGE ANALYZER FOR DATA ASSETS

CROSS-REFERENCE TO RELATED APPLICATION

This Utility patent application is a Continuation of U.S. patent application Ser. No. 16/389,389 filed on Apr. 19, 2019, now U.S. Pat. No. 11,194,845 issued on Dec. 7, 2021, the benefit of the filing date of which is hereby claimed under 35 U.S.C. § 120 and the contents of which is further incorporated in entirety by reference.

TECHNICAL FIELD

The present invention relates generally to data visualization, and more particularly, but not exclusively, to managing the display of objects included in data visualizations.

BACKGROUND

Organizations are generating and collecting an ever increasing amount of data. This data may be associated with disparate parts of the organization, such as, consumer activity, manufacturing activity, customer service, server logs, or the like. For various reasons, it may be inconvenient for such organizations to effectively utilize their vast collections of data. In some cases the quantity of data may make it difficult to effectively utilize the collected data to improve business practices. Accordingly, in some cases, organizations may employ various applications or tools to generate visualizations based on some or all of their data. Employing visualizations to represent data may enable organizations to improve their understanding of business operations, sales, customer information, employee information, key performance indicators, or the like. In some cases, sophisticated visualizations may incorporate or otherwise depend on data from a variety of sources within an organization, including different databases. In some cases, there may be many different visualizations may depend on these varied or disparate data sources. Accordingly, even seemingly minor changes made to databases or other data providers may have a wide-spread impact on one or more visualizations or applications that are currently in use. In some cases, determining the impact of data changes (e.g., modifying column of a database table) may be difficult because, in some circumstances, determining which end-user applications may be impacted by a change may be difficult. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF THE VARIOUS EMBODIMENTS

Figure 1:
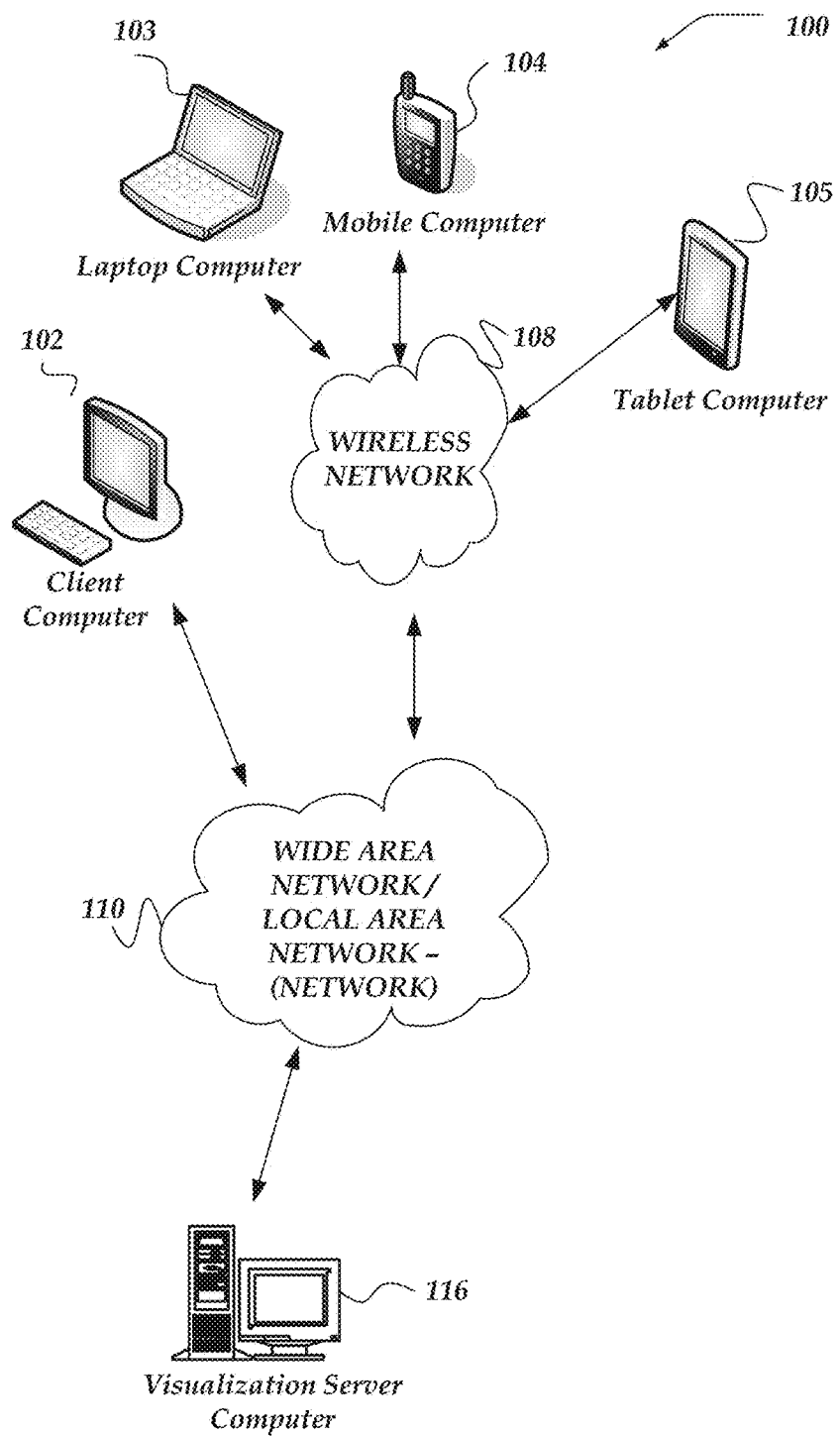
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, Kotlin, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine. Also, in some embodiments, one or more portions of an engine may be a hardware device, ASIC, FPGA, or the like, that performs one or more actions in the support of an engine or as part of the engine.

As used herein the term "data model" refers to one or more data structures that represent one or more entities associated with data collected or maintained by an organization. Data models are typically arranged to model various operations or activities associated with an organization. In some cases, data models are arranged to provide or facilitate various data-focused actions, such as, efficient storage, queries, indexing, search, updates, or the like. Generally, a data model may be arranged to provide features related to data manipulation or data management rather than providing an easy to understand presentation or visualizations of the data.

As used herein the term "data object" refers to one or more entities or data structures that comprise data models. In some cases, data objects may be considered portions of the data model. Data objects may represent classes or kinds of items, such as, databases, data-sources, tables, workbooks, visualizations, work-flows, or the like.

As used herein the term "data object class" or "object class" refers to a one or more entities or data structures that represent a class, kind, or type of data objects.

As used herein the term "display model" refers to one or more data structures that represent one or more representations of a data model that may be suitable for use in a visualization that is displayed on one or more hardware displays. Display models may define styling or user interface features that may be made available to non-authoring user.

As used herein, the term "lineage model" refers to one or more data structures that represent a specialized model for representing lineage information for a corresponding data model.

As used herein, the term "lineage object" refers to one or more data structures comprising a lineage model that may correspond to data object classes represented by the lineage model.

As used herein, the term "display object" refers to one or more data structures that comprise display models. In some cases, display objects may be considered portions of the display model. Display objects may represent individual instances of items or entire classes or kinds of items that may be displayed in a visualization. In some embodiments, display objects may be considered or referred to as views because they provide a view of some portion of the data model.

As used herein, the term "anchor data object" refers to a data object that has been designated to be a starting point for a lineage analysis for a data model. Anchor data objects may be data objects that are designed or selected from a one or more data objects associated with a lineage object.

As used herein, the term "anchor attribute" refers to a attribute, field, or property of a data object that has been selected to be a starting point for executing attribute level data lineage analysis.

As used herein, the term "panel" refers to region within a graphical user interface (GUI) that has a defined geometry (e.g., x, y, z-order) within the GUI. Panels may be arranged to display information to users or to host one or more interactive controls. The geometry or styles associated with panels may be defined using configuration information, including dynamic rules. Also, in some cases, users may be enabled to perform actions on one or more panels, such as, moving, showing, hiding, re-sizing, re-ordering, or the like.

As used herein, the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing data using a network computers. In one or more of the various embodiments, a data model that includes a plurality of data objects that may be associated with one or more layers of the data model may be provided.

In one or more of the various embodiments, a lineage model that includes one or more lineage objects may be provided such that the one or more lineage objects may each be associated with one of the one or more data model layers.

In one or more of the various embodiments, one of the one or more lineage objects may be activated based on an association with a data model layer.

In one or more of the various embodiments, a first portion of the plurality of data objects may be determined based on the data model, the activated lineage object, or the like, such that the first portion of data objects and the activated lineage object may be associated with the same data model layer In one or more of the various embodiments, an anchor object from the first portion of data objects may be determined based on one or more characteristics of the first portion of data objects.

In one or more of the various embodiments, a search of the data model may be employed to provide dependency information based on a position of the anchor data object in the data model. In one or more of the various embodiments, providing the dependency information may include: determining one or more attributes that may be associated with the anchor data object; searching the data model based on the one or more attributes or one or more other attributes that may be associated with the plurality of data objects in the data model; providing the dependency information based on one or more associations or the one or more attributes and the one or more other attributes. In one or more of the various embodiments, providing the dependency information, may include: generating query information based on the data model and the anchor data object; employing the query information to execute a query that may provide the dependency information; or the like.

In one or more of the various embodiments, a second portion of the plurality data objects may be determined based on the dependency information. In one or more of the various embodiments, determining the second portion of the data objects may include modifying the second portion of data objects based on one or more filters that may be displayed in the lineage panel.

In one or more of the various embodiments, in response to a modification to one or more of the plurality of data objects, further actions may be performed, including: determining the activated lineage object based on the one or more modified data objects; determining the anchor data object based on the one or more modified data objects; determining one or more users that are associated the modification based on the dependency information such that each user may be associated with one or more data objects that may be impacted by the modification; providing one or more notifications to each user based on each impacted data object associated with the user; or the like.

In one or more of the various embodiments, one or more reports that include a list of the second portion of data objects, the dependency information, or the like, may be provided.

In one or more of the various embodiments, a display engine may be instantiated to perform actions, including: generating a graphical user interface (GUI) that may include a lineage panel and an object panel; displaying, in the lineage panel, the lineage model and the one or more lineage objects; displaying, in the object panel, the first portion of the data objects; and determining another activated lineage object based on one or more inputs to the lineage panel; automatically determining another portion of the plurality of data objects based on the other activated lineage object, wherein the other portion of the data objects may be displayed in the object panel; or the like.

In one or more of the various embodiments, one or more data object classes may be provided based on the data model such that the one or more data object classes include one or more of databases, tables, data sources, workbooks, sheets, or the like. And, in one or more of the various embodiments, each layer of the data model may be associated with one of the one or more data object classes such that each data object may be associated with a data object class that may correspond with a data object class that may be associated with the layer.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, visualization server computer 116, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, visualization server computer 116, or other computers.

Client computers 102-105 may further be configured to include a client application that enables an end-user to log into an end-user account that may be managed by another computer, such as visualization server computer 116, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by visualization server computer 116.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, visualization server computer 116, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of visualization server computer 116 is described in more detail below in conjunction with FIG. 3. Although FIG. 1 illustrates visualization server computer 116 as a single computer, the innovations or embodiments are not so limited. For example, one or more functions of visualization server computer 116, or the like, may be distributed across one or more distinct network computers. Moreover, in one or more embodiments, visualization server computer 116 may be implemented using a plurality of network computers. Further, in one or more of the various embodiments, visualization server computer 116, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
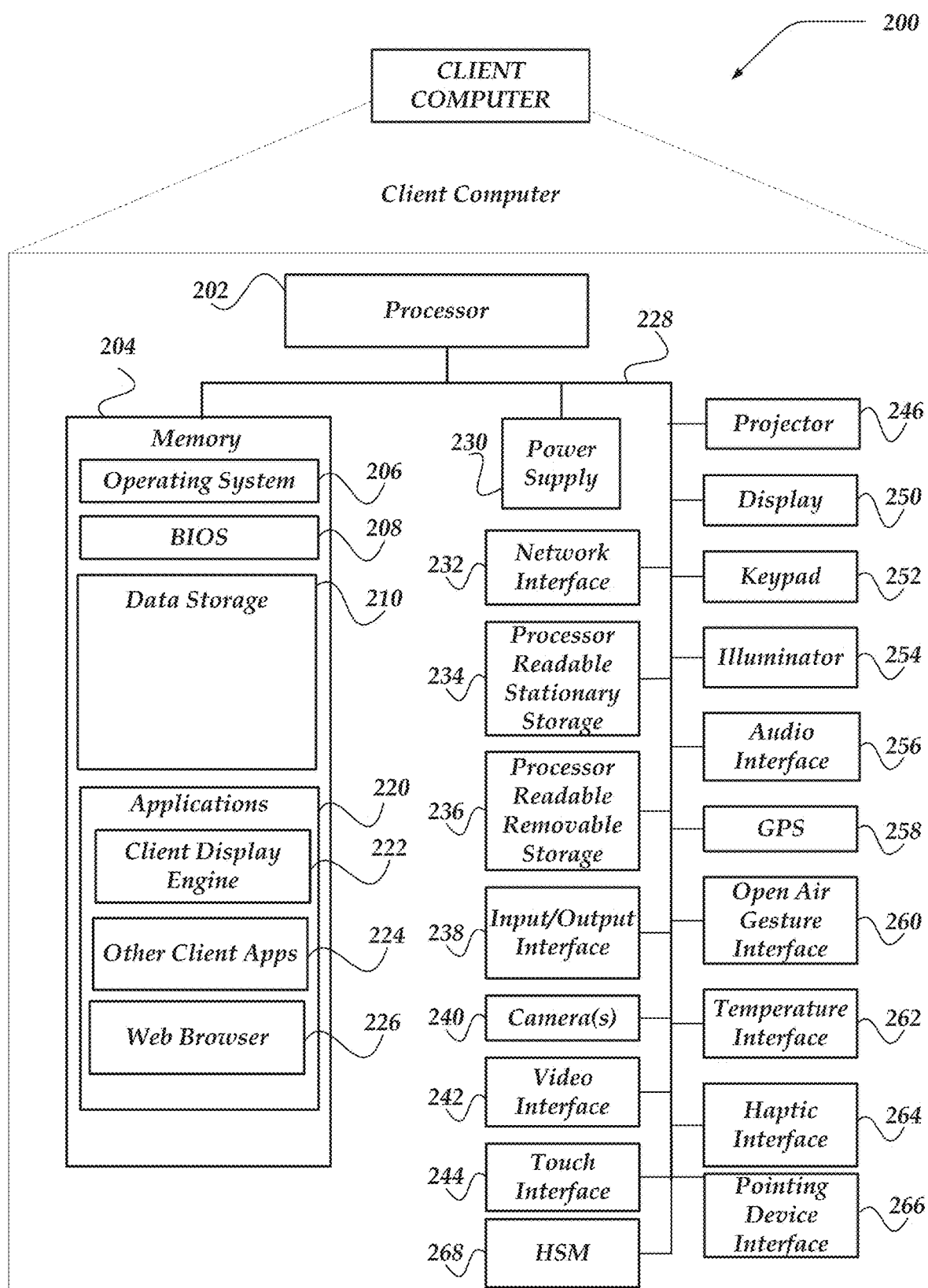
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

In at least one of the various embodiments, applications, such as, operating system 206, client display engine 222, other client apps 224, web browser 226, or the like, may be arranged to employ geo-location information to select one or more localization features, such as, time zones, languages, currencies, calendar formatting, or the like. Localization features may be used in documents, visualizations, display objects, display models, action objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, Android™, or the IOS operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, client display engine 222, other client applications 224, web browser 226, or the like. Client computers may be arranged to exchange communications, such as, queries, searches, messages, notification messages, event messages, alerts, performance metrics, log data, API calls, or the like, combination thereof, with visualization server computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware microcontrollers instead of CPUs. In one or more embodiment, the one or more microcontrollers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
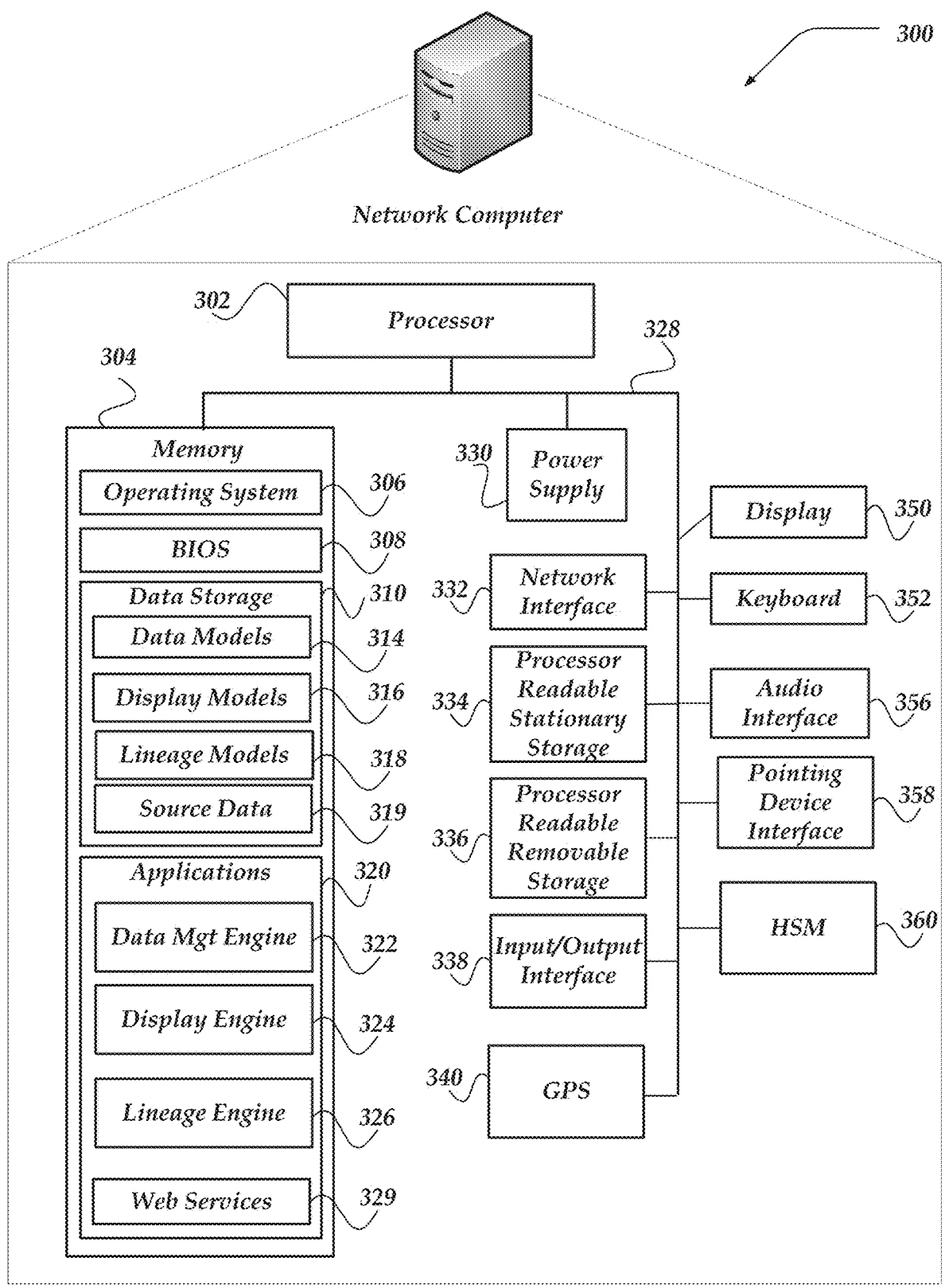
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of one or more visualization server computer 116 of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Realtime Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, data management engine 322, display engine 324, lineage engine 326, web services 329, or the like, may be arranged to employ geo-location information to select one or more localization features, such as, time zones, languages, currencies, currency formatting, calendar formatting, or the like. Localization features may be used in documents, file systems, user-interfaces, reports, display objects, display models, visualizations as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, data models 314, display models 316, graph models 318, source data 319, or the like. Data models 314 may store files, documents, versions, properties, meta-data, data structures, or the like, that represent one or more portions of one or more data models. Display models 316 may store display models. Lineage models 318 may represent memory used for storing lineage models. Source Data 319 may represent memory used for storing databases, or other data sources that contribute the data that underlies the data models, lineage models, display models, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include data management engine 322, display engine 324, lineage engine 326, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, data management engine 322, display engine 324, lineage engine 326, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to data management engine 322, display engine 324, web services 329, or the like, may be provisioned and de-commissioned automatically.

Also, in one or more of the various embodiments, data management engine 322, display engine 324, lineage engine 326, web services 329, or the like, may be located in virtual servers running in a cloud-based computing environment rather than being tied to one or more specific physical network computers.

Further, network computer 300 may also include hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiment, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
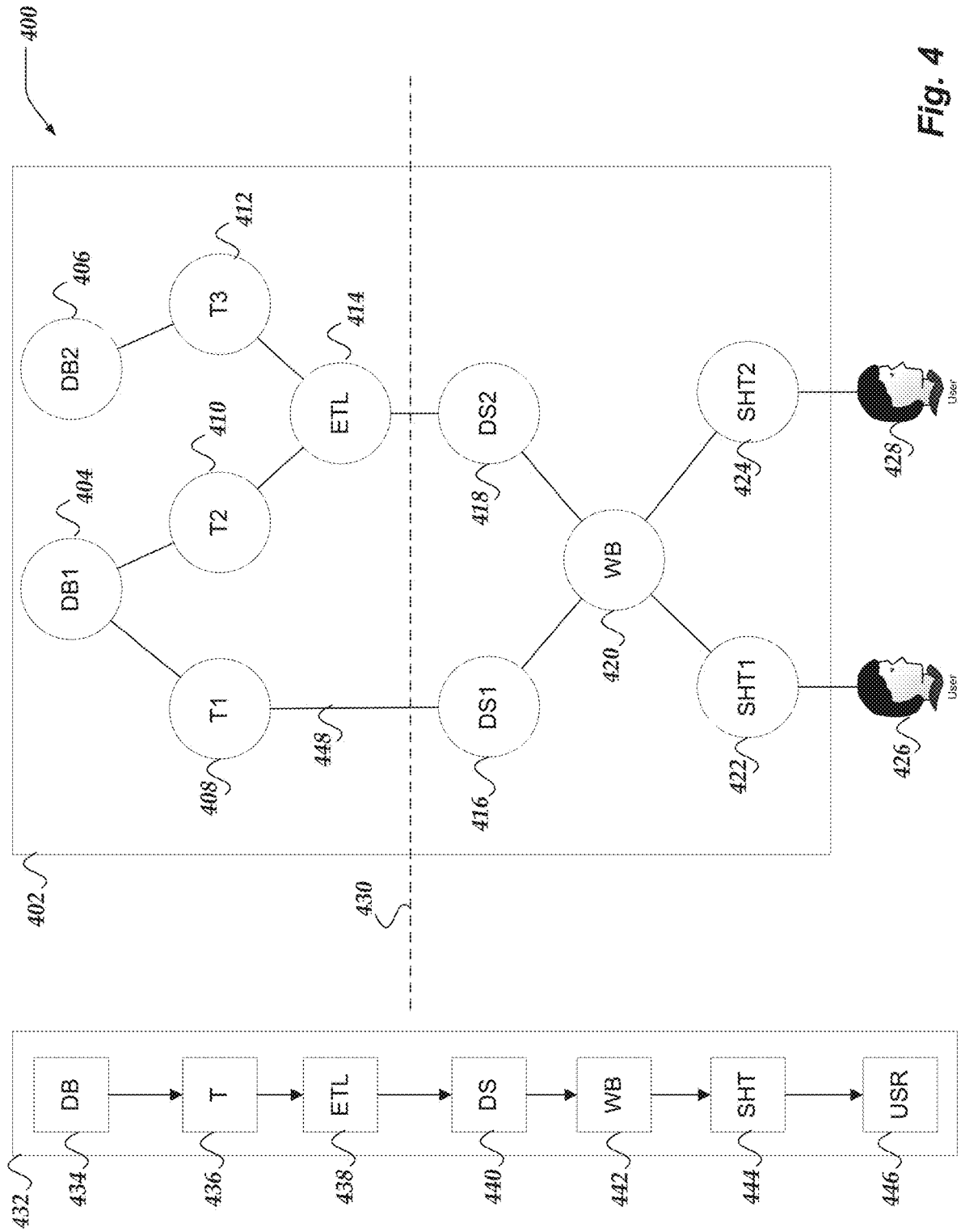
FIG. 4 illustrates a logical architecture of a system for interactive lineage analysis for data assets in accordance with one or more of the various embodiments.

FIG. 4 illustrates a logical architecture of system 400 for interactive lineage analysis for data assets in accordance with one or more of the various embodiments. In one or more of the various embodiments, system 400 may include various components, such as, data model 402, which may be comprised of various data objects ranging from one or more databases objects to one or more visualizations. In this example, data model 402 includes database object 404, database object 406, table object 408, table object 410, table object 412, workflow object 414, data source object 416, data source object 418, workbook object 420, sheet object 422, and sheet object 424.

In one or more of the various embodiments, visualization server computers, such as, visualization server computer 116 may be arranged to employ data models, such as, data model 402 to represent information that may be used for generating visualizations. Also, in some embodiments, data models may be used to manage other actors in a visualization system, including, users, authors, or the like.

In this example, data model 402 may have one or more root level data objects, such as, data object 404 and data object 406. Data object 404 and data object 406 represent databases that may be a source of information that drives the data model. For example, data object 404 may represent a SQL RDBMS associated with one part of an organization while data object 406 may represent an API gateway to another information provider or another databases.

In one or more of the various embodiments, data object 408, data object 410, data object 412, or the like, represent tables or table-like objects that may be provided by one or more databases. At this level of the data model, the data objects may be considered to wrap or otherwise closely model the entities provided from the databases. Accordingly, in some embodiments, properties or attributes of table or database objects may closely mirrors their native representations, in terms of attribute names, data types, table names, column names, or the like. For example, data administrators may be enabled to "import" databases or tables into a data model such that the imported objects retain some or all of the features or attributes that are available in native form.

In one or more of the various embodiments, before an imported table object may be used for visualizations, data administrators may have to perform or execute one or more actions to the prepare the information for consumption by visualizations or visualization authors. In this example, extract-transform-load (ETL) object 414 represents an ETL process that does some processing on information in table object 410 and table object 412 before it is made available for use in visualizations.

In one or more of the various embodiments, data source objects, such as, data source 416 or data source 418 represent data objects that may be available for visualization authors to incorporate into visualizations or other display models. In some embodiments, data source objects may provide data administrators control to manage or otherwise shape the information from databases (e.g., database 404 or database 406) that may be made available to visualizations or visualization authors. For example, one or more tables in database 404 may include sensitive information that an organization want to exclude from visualizations. Accordingly, in some embodiments, by selecting mapping attributes from table objects to data source objects, data administrators may control how data is exposed from the underlying databases. In some embodiments, data administrators may be enabled select particular columns or attributes from table objects to include in data sources. Also, in some embodiments, attribute names (e.g., column names) in table objects may be mapped to different names in data sources. For example, a table column named customer identifier in a table object may be mapped to an attributed named 'Account Number' in the data source. Further, in some embodiments, other transformations of mappings may be performed, such as, data type conversions, aggregations, filtering, combining, or the like. In some embodiments, extensive or complex transformations may be encapsulated in ETL objects, or the like, whereas simpler or more common transformations may be enabled without using a separate ETL object.

In one or more of the various embodiments, edge 448 represents a mapping from a table object to a data source. In this example, edge 448 may represent the one or more data structures that map one or more attributes (e.g., columns) of table object 408 to data source 416. Accordingly, in some embodiments, edge 448 provides or is associated one or more mapping rules or instructions that define which information from table object 408 is available in data source 416, as well as, how the information from table object 408 may appear to visualization authors.

In one or more of the various embodiments, workbook object 420 represents a data object that may be associated with one or more user level data objects, such as, sheet object 422 or sheet object 424. In some embodiments, visualization authors may be enabled to design workbooks, such as, workbook object 420, based on information provided by one or more data sources, such as, data source 416 or data source 418. In some embodiments, visualization authors may design workbooks that include one or more sheets (e.g., sheet object 422 or sheet object 424. In some embodiments, sheet objects may include one or more visualizations, or the like.

In one or more of the various embodiments, sheet object 422 or sheet object 424 may represent some or all of the information that may be provided to a visualization engine, or the like, that generates one or more interactive visualization applications or reports that may be employed by users. In this example, sheet object 422 or sheet object 424 may be considered to include or reference one or more of data, meta-data, data structures, or the like, that may be used to render one or more visualizations of information that may be provided by one or more databases. In some embodiments, sheets may be arranged to include one or more display models, styling information, text descriptions, narrative information, stylized graphics, links to other sheets, or the like.

Accordingly, in some embodiments, users, such as, user 426 or user 428 may be enabled to access the sheets. The content or visualizations in a sheet may depend on its design and the information it is based on (e.g., the information from database 404 or database 406). Typically, sheets or the included visualizations may be dependent one or more fields, nodes, columns, or the like, from one or more databases. Likewise, in some embodiments, dependencies that may be associated with a database may propagate through other data objects, such as, tables, data sources, workbooks, or the like. In some cases, other data objects interposed between a sheet and its underlying database may introduce additional dependencies that may propagate through to sheets or visualizations.

In some embodiments, upstream changes to one or more data objects may impact one or more downstream sheets or visualizations. In some cases, upstream changes may break sheets or visualizations such that users or authors easily see that there were changes to upstream data objects based on error messages associated with a broken sheet or visualization. For example, if a visualization depends on an upstream field or attribute, removing or renaming that attribute may cause an error that identifies a missing attribute.

However, in some embodiments, some or many upstream changes may have impacts that may not be obvious to a user. For example, in some embodiments, an upstream change may modify the meaning or semantics of an attribute such that it still provides a information that may be consumed by the visualization without generating a system error even though the meaning of the information has changed. In this example, a user may be unaware that an upstream change has occurred even though their visualization is no longer producing correct results.

Similarly, in some embodiments, data administrators managing the databases or other data objects for an organization may be disabled from easily determining the potential downstream impacts a change to a data object or data model may cause. For example, data administrators may propose one or more changes to a database, however, it may be difficult for them to estimate, validate, or confirm the potential impacts such changes may have on downstream users.

Accordingly, in one or more of the various embodiments, a lineage engine, such as, lineage engine 326 may be arranged to generate and maintain one or more lineage models, such as, lineage model 432 that provide lineage information that may be associated with data model 402. In one or more of the various embodiments, a lineage model may be arranged to include one or more lineage objects, such as, lineage object 434, lineage object 436, lineage object 438, lineage object 440, lineage object 442, lineage object 444, lineage object 446, or the like.

In one or more of the various embodiments, lineage objects may represent types of data objects that may be part of a same layer of data model. In some embodiments, members of a layer of a data model may include data objects that may have the same or similar features or purposes. For example, lineage object 434 represents data objects that may be considered to be databases, such as, data object 404 and data object 406. And, for example: lineage object 436 may represent data objects that represent tables, such as, data object 408, data object 410, data object 412, or the like; lineage object 438 may represent data objects that represent ETL processes, such as, data object 414, or the like; lineage object 440 may represent data objects that represent data sources, such as, data object 416, data object 418, or the like; lineage object 442 may represent data objects that represent workbooks, such as, data object 420, or the like; lineage object 444 may represent data objects that represent sheets, such as, sheet data object 422, sheet data object 424, or the like. Also, in some objects, lineage models may be arranged to include lineage objects that represent one or more users that may be associated with a sheet or visualization, such as, user 426, user 428, or the like.

In one or more of the various embodiments, lineage models may be arranged to represent more or fewer classes of data objects. For example, in some embodiments, if a lineage engine is restricted or otherwise disabled from identifying which users may be associated with sheets, the lineage model may omit the lineage objects that represent users, such as, lineage object 446.

In one or more of the various embodiments, lineage engines may be arranged to automatically investigate data model 402 to determine its lineage objects based on the data object classes or data model layers in data model. In some embodiments, one or more data objects or data object classes in a data model may be excluded from lineage engines or lineage models for various reasons, such as, security considerations, or the like. Accordingly, in some embodiments, lineage engines may be arranged to employ one or more rules, filters, or conditions provided via configuration information to determine which lineage objects to include in lineage models.

Figure 5:
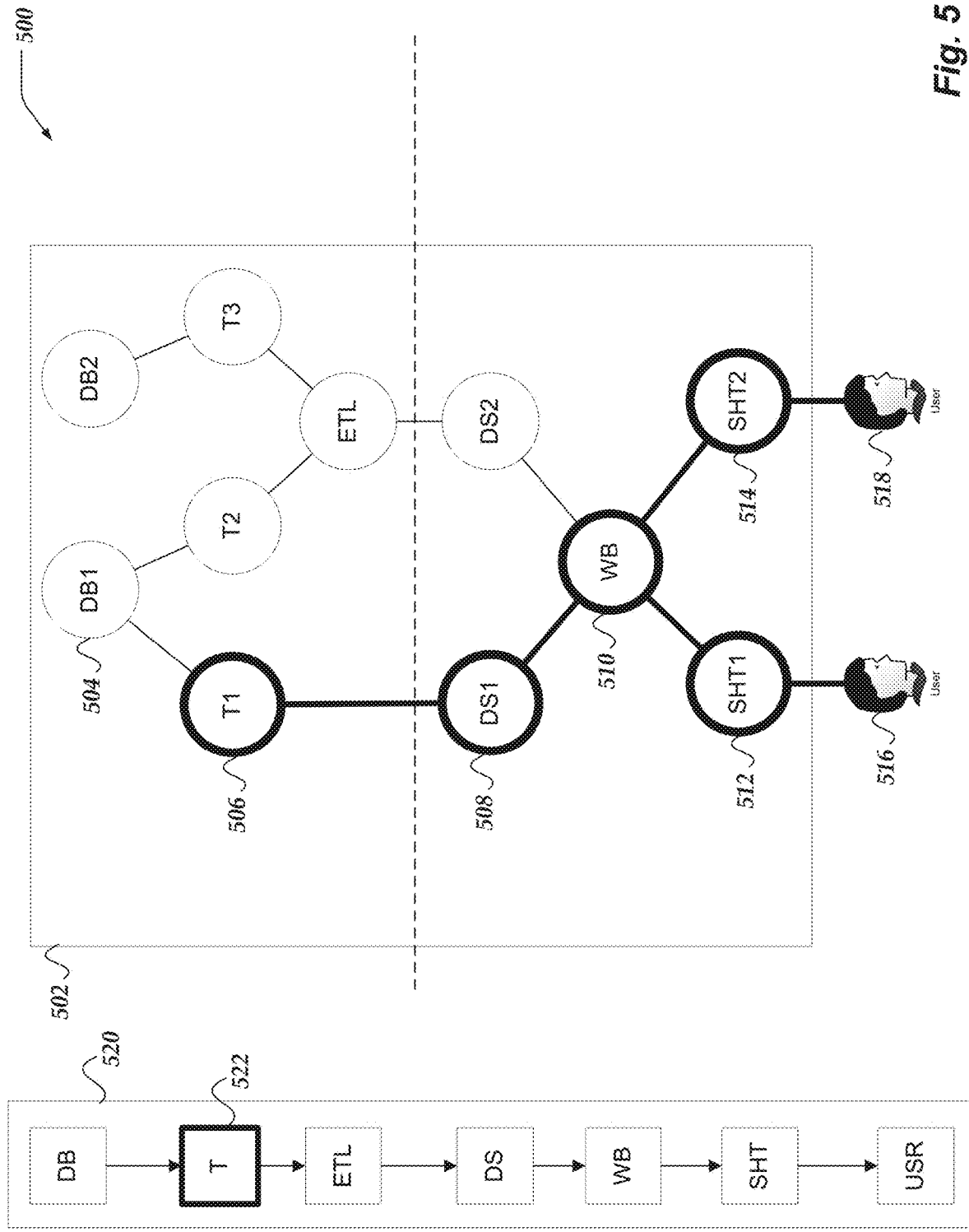
FIG. 5 illustrates a logical representation of a portion of a system for interactive graph-based data visualization that may be in accordance with one or more of the various embodiments.

FIG. 5 illustrates a logical representation of a portion of system 500 for interactive graph-based data visualization that may be in accordance with one or more of the various embodiments. In this example, for some embodiments, data model 502 may be considered similar to data model 402 described above. In this example, data object 506 represents a data object that a data administrator may be considering to modify. Accordingly, in this example, changes to data object 506 may impact various downstream data objects, such as, data object 508, data object 510, data object 512, data object 514, or the like. Also, in this example, user 516 or user 518 may be users that rely on or own data object 512 or data object 514.

Also, in this example, for some embodiments, lineage model 520 may be a lineage model that a lineage engine generated based on data model 502. Accordingly, in this example, for some embodiments, lineage object 522 may represent one of the lineage objects included in lineage model 520.

Accordingly, in some embodiments, if a lineage object in a lineage model is activated, the lineage engine may be arranged to determine the data objects in its corresponding data model (e.g., data model 502) that may depend on data objects associated with the activated lineage object.

In one or more of the various embodiments, if a lineage object may be activated, the lineage engine may be arranged to determine the data objects in the data model that may be included in the data model layer that corresponds to the activated lineage object. In this example, the activated lineage object may be lineage object 522. In this example, lineage object 522 may be considered to correspond to a table layer in data model 502. Accordingly, in this example, the lineage engine may determine some or all of the data objects in data model 502 that may be associated with table layer.

In some embodiments, if the data objects associated with a lineage object may be determined, the lineage engine may determine one or more anchor data objects based on one or more rules, user inputs, or the like, that may be provided by configuration information. For example, in some embodiments, configuration information may include rules that automatically select one or more data objects (e.g., last data object accessed, first in a sorted list, or the like). Also, in some embodiments, lineage engines may be arranged to determine one or more anchor data objects based on user input. For example, a data administrator may select data object 506 because it may be associated with one or more pending modifications.

In one or more of the various embodiments, if an anchor data object has been determined, a lineage engine may be arranged to initiate a search of the data model to determine lineage information that includes dependency information based on the anchor data object.

In one or more of the various embodiments, lineage engines may be arranged to determine various information about the data objects that may be associated with one or more lineage objects. In some embodiments, lineage engines may be arranged to determine the number of data objects that may be associated with the data model layer that may be associated with each lineage object. For example, in some embodiments, lineage engines may associate one or more lineage objects with the number of data objects associated with a given lineage object. In other embodiments, lineage objects may include other information, such as, identifying one or one restricted data objects in the data model. For example, if data model 502 included a restricted table data object (not shown), lineage object 522 may be arranged to have a property that may store such information.

In one or more of the various embodiments, lineage engines may be arranged to execute one or more filters or other rules to exclude one or more data objects from the aggregate data model layer information. For example, if data model 502 included one or more tables data objects (not shown) that were configured to be inaccessible to a data administrator, the one or more tables data objects may be excluded or otherwise distinguished from data objects that a data administrator may view or modify.

In one or more of the various embodiments, lineage engines may be arranged to generate lineage models for investigating dependencies of data objects based on an activated lineage object. Further, in some embodiments, lineage engines may be arranged to further refine a dependency investigation based on one or more data objects that may be designated as anchor data objects. For example, if data object 506 is an anchor data object, lineage object 522 may be considered activated because data object 506 is in the data model layer that corresponds to lineage object 522 (e.g., data object class tables). Accordingly, in some embodiments, lineage engines may be arranged execute a search of the data model that traces the dependencies associated with the anchor data object based on the position of the anchor data object in the data model rather than searching the entire data model.

In this example, if data object 506 is the anchor data object, the lineage engine may determine the dependency path associated with data object 506. Here, this path in data model 502 is illustrated using bold/thickened lines and includes, data object 506, data object 508, data object 510, data object 512, data object 514, user 516, and user 518.

Also, in this example, the appearance of lineage object 522 may be modified to indicate that it represents an active data model layer.

Figure 6:
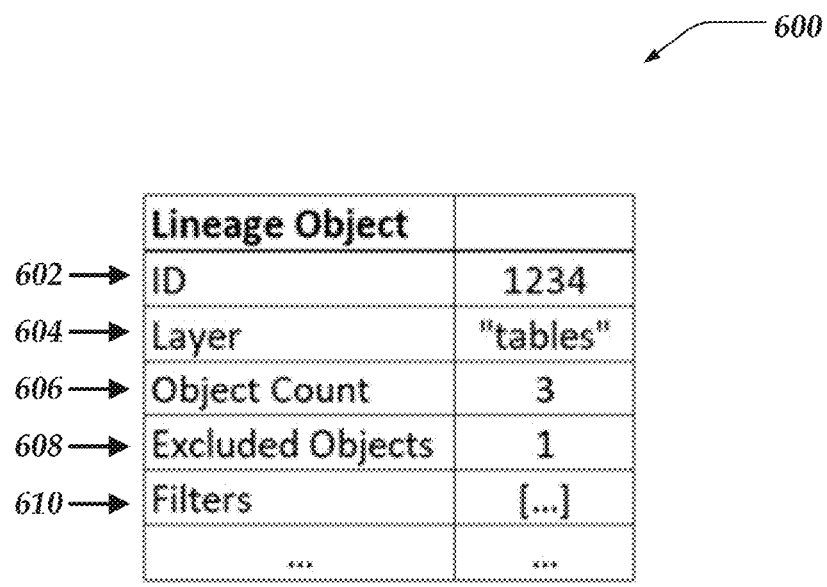
FIG. 6 illustrates a logical schematic of a lineage object that represents a data structure for managing lineage information in accordance with one or more of the various embodiments.

FIG. 6 illustrates a logical schematic of lineage object 600 that represents a data structure for managing lineage information in accordance with one or more of the various embodiments. In some embodiments, lineage objects may be arranged to include various information that may be associated with the data objects that may be associated with the lineage object. In some embodiments, lineage engines may be arranged to determine the particular information to be collected and included in a lineage object based on configuration information, or the like.

In one or more of the various embodiments, lineage objects may include various properties that may be used to store information or reference to information associated with one or more data objects associated with a data model layer. In this example, for some embodiments, lineage object 600 includes properties, such as, identifier property 602, layer property 604, object count property 606, excluded object count property 608, filters property 610, or the like.

In some embodiments, layer properties, such as, property 604 may include an identifier (e.g., ID, reference number, pointer, label, tags, or the like) that indicates which layer of the data model that the lineage object represents. In this example, property 604 has a value of "tables" which indicates it may be associated with the table layer of a data model. Likewise, for example, if property 604 had a value of "data source" it may indicate that the lineage object may be associated with the "data source" layer of a data model. Alternatively, in some embodiments, a data object class property (not shown) may be included rather than or in addition to layer property 604.

In one or more of the various embodiments, lineage objects may be arranged to have one or more properties for aggregated information values, such as, counts, averages, sums, or the like. In this example, property 606 may store a value representing the number of data objects that may be associated with this lineage object. Similarly, in this example, property 608 may store a value representing the number of data objects in the "table" layer that have been excluded from the object count in property 606. In some embodiments, one or more data objects may be excluded for various reasons, including: data objects that may be hidden or otherwise inaccessible to the data administrator; data objects that may be excluded based on a filter or other configuration; or the like. And, in this example, property 610 may store filter information or references to filter information that a lineage engine may apply.

Figure 7:
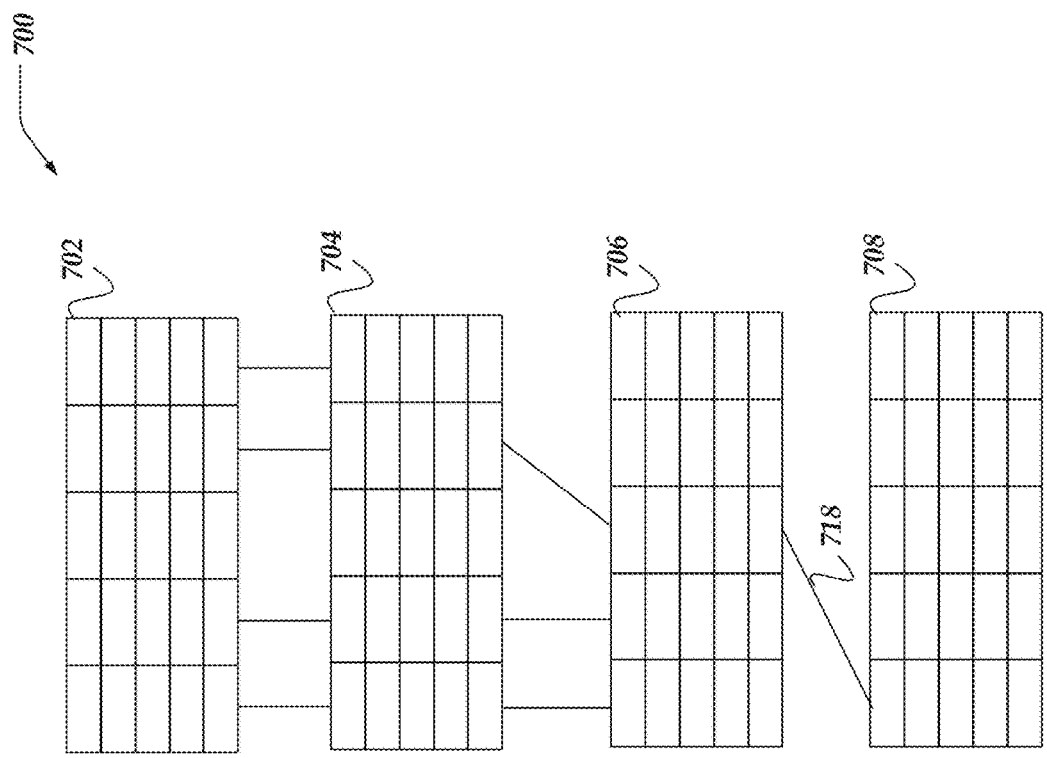
FIG. 7 illustrates a logical schematic of a portion of a system that shows dependencies in a data model in accordance with one or more of the various embodiments.
Figure 7:
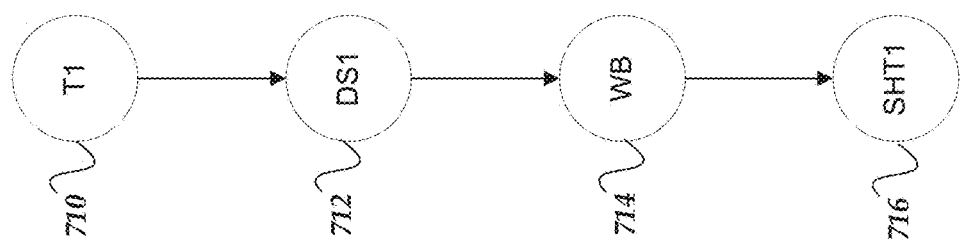

FIG. 7 illustrates a logical schematic of a portion of system 700 that shows dependencies in a data model in accordance with one or more of the various embodiments. In this example, system 700 comprises, data object 702, data object 704, data object 706, data object 708, or the like. Also, in this example, system 700 comprises a portion of a lineage model that includes lineage object 710, lineage object 712, lineage object 714, lineage object 716, or the like.

As described above, in one or more of the various embodiments, data objects in a data model may depend on other data objects in the same data model. In this example, data object 704, data object 706, and data object 708 depend on data object 702. Accordingly, in this example, data object 708 depends on data object 706, and so on. Note, while all of the data objects in this example are part of the same dependency tree that has data object 702 as its root, there may be other data objects in the same data model that have different or separate dependency graphs.

In one or more of the various embodiments, data objects in a data model may be dependent on another data object because they depend on one or more attributes of the other data objects. In FIG. 7, the lines connecting the columns in the data objects to other columns in the data objects represent the dependencies between data objects at the attribute level. Accordingly, in this example, data object 702 has five columns which may be considered five attributes. In this example, the lines connecting data object 702 to data object 704 represent that data object 704 depends on four attributes of data object 702. Similarly, in this example, data object 706 depends directly on three attributes of data object 704 and indirectly on three attributes of data object 702. Also, similarly, in this example, data object 708 directly depends on one attribute from data object 706 and indirectly on one attribute of data object 706, data object 704, and data object 702. Thus, in this example, all of the data objects depend on one or more of their parents, however, the dependencies between data objects may be based on fewer than all of attributes. For example, line 718 represent that data object 708 depends on one field or attributes of data object 706.

In some embodiments, the dependencies between attributes or data object in general may depend one or more functions, filters, transforms, or the like, that may be applied to attribute values as they are passed down to descendant data objects. For example, a table data object may include a timestamp attribute stored as Unix epoch timestamp. But, in this example, a dependent data source may have an attribute labeled Date that expects a conventional date representation rather than a Unix epoch timestamp. Accordingly, in this example, the Date attribute of the dependent data source may be associated with a transform action that converts the Unix epoch timestamp value provided by the parent table into a conventional date value that meets the requirements of the data source.

Also, in this example: lineage model 710 may be considered to correspond with the data model layer "tables" (not shown) that includes data object 702; lineage model 712 may be considered to correspond with the data model layer "data source" (not shown) that includes data object 704; lineage model 714 may be considered to correspond with the data model layer "workbooks" (not shown) that includes data object 706; and lineage model 716 may be considered to correspond with the data model layer "sheets" (not shown) that includes data object 708.

Figure 8A:
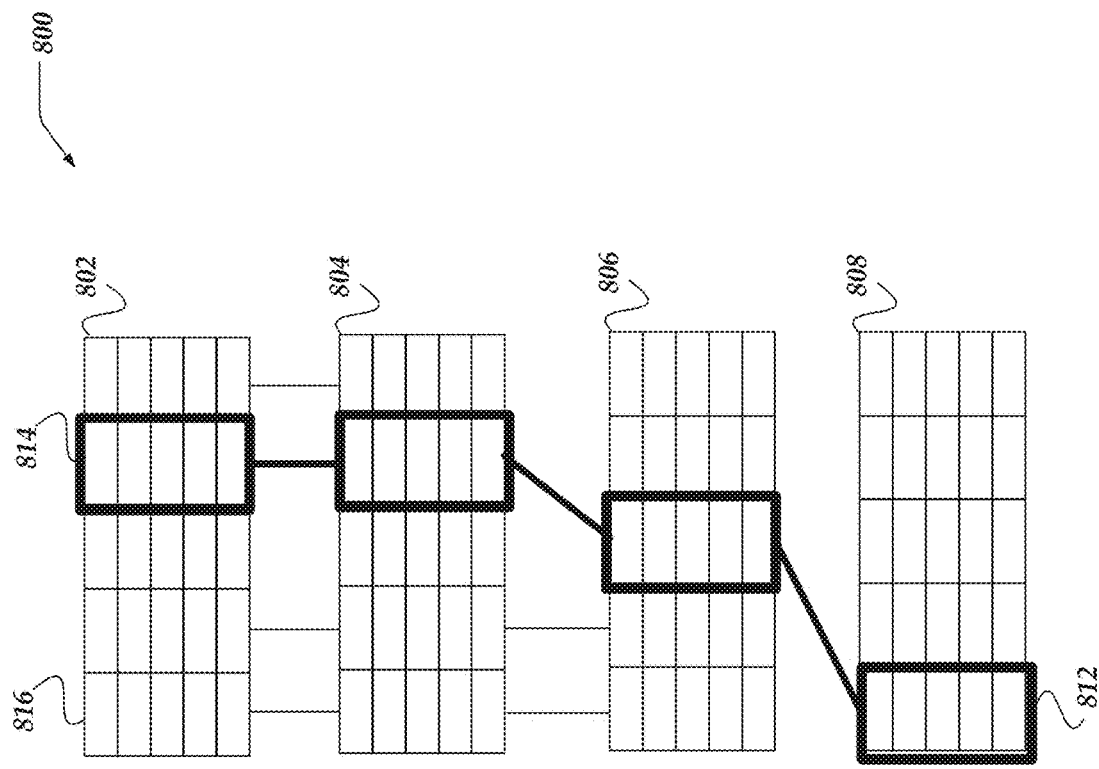
FIG. 8A illustrates a logical schematic of a portion of a system that shows dependencies in a data model in accordance with one or more of the various embodiments.
Figure 8A:
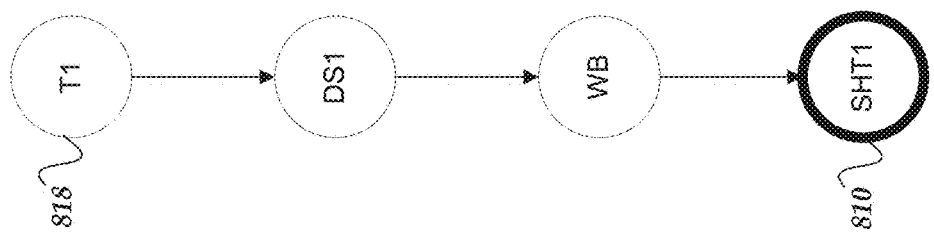

FIG. 8A illustrates a logical schematic of a portion of system 800 that shows dependencies in a data model in accordance with one or more of the various embodiments. In this example, system 800 may be considered similar to system 700 described above. In this example, for some embodiments, system 800 includes, data object 802, data object 804, data object 806, and data object 808.

In one or more of the various embodiments, a lineage object in a lineage model may be associated with an anchor data object. Accordingly, in some embodiments, lineage engines may be arranged to determine dependency information based on a search of the data model. In this example, if data object 808 is the anchor data object, lineage object 810 may be activated. Also, in this example, for some embodiments, a lineage engine may be arranged to execute a search of the data model to determine that data object 808 depends on data object 806, data object 804, and data object 802.

In one or more of the various embodiments, the lineage engine may be arranged to determine the dependencies by searching the data model to determine which attributes in a data object may depend on attributes or other data objects.

In this example, the lineage engine may determine that attribute 812 of data object 808 depends on attribute 814 of data object 802.

Accordingly, in one or more of the various embodiments, attribute level dependency analysis enables the a lineage engine to determine which data objects may be impacted by a modification to individual attributes. In this example, for some embodiments, a lineage analysis may identify that attribute 816 of data object 802 may be modified without impacting data object 808.

Figure 8B:
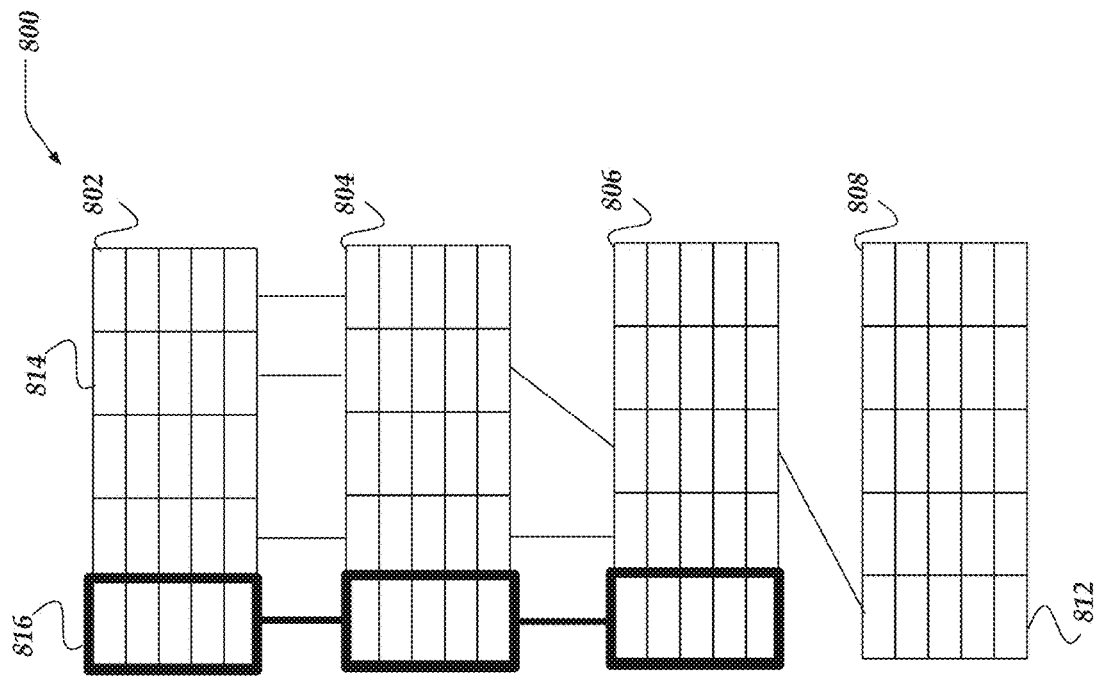
FIG. 8B illustrates a logical schematic of a portion of a system that shows dependencies in a data model in accordance with one or more of the various embodiments.
Figure 8B:
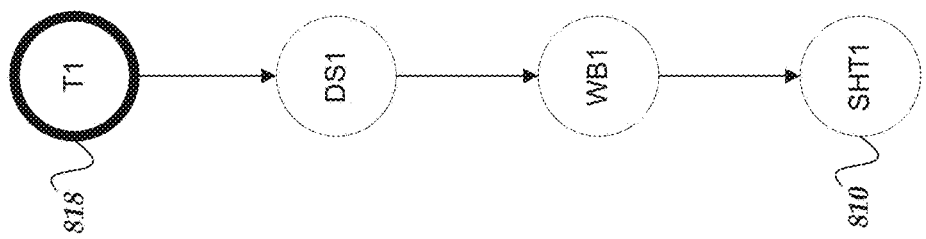

FIG. 8B illustrates a logical schematic of a portion of system 800 that shows dependencies in a data model in accordance with one or more of the various embodiments. In this example, system 800 may be considered similar to system 700 described above. In this example, for some embodiments, system 800 includes, data object 802, data object 804, data object 806, and data object 808.

In this example, lineage object 818 may be considered the activated lineage object (indicated by the bold line weight) and data object 802 may be considered the anchor data object. Accordingly, in this example, the lineage analysis performed by a lineage engine may identify that data object 806 and data object 804 depend on attribute 816 of data object 802. Accordingly, in this example, if attribute 816 is modified, data object 804 and data object 806 may be impacted while data object 808 will not be impacted by a modification to attribute 816 because none of the attributes of data object 808 depend directly or indirectly on attribute 816.

Likewise, in this example, since lineage object 818 is the activated lineage object, lineage object 810 may be deactivated (indicated by normal line weight).

Figure 9:
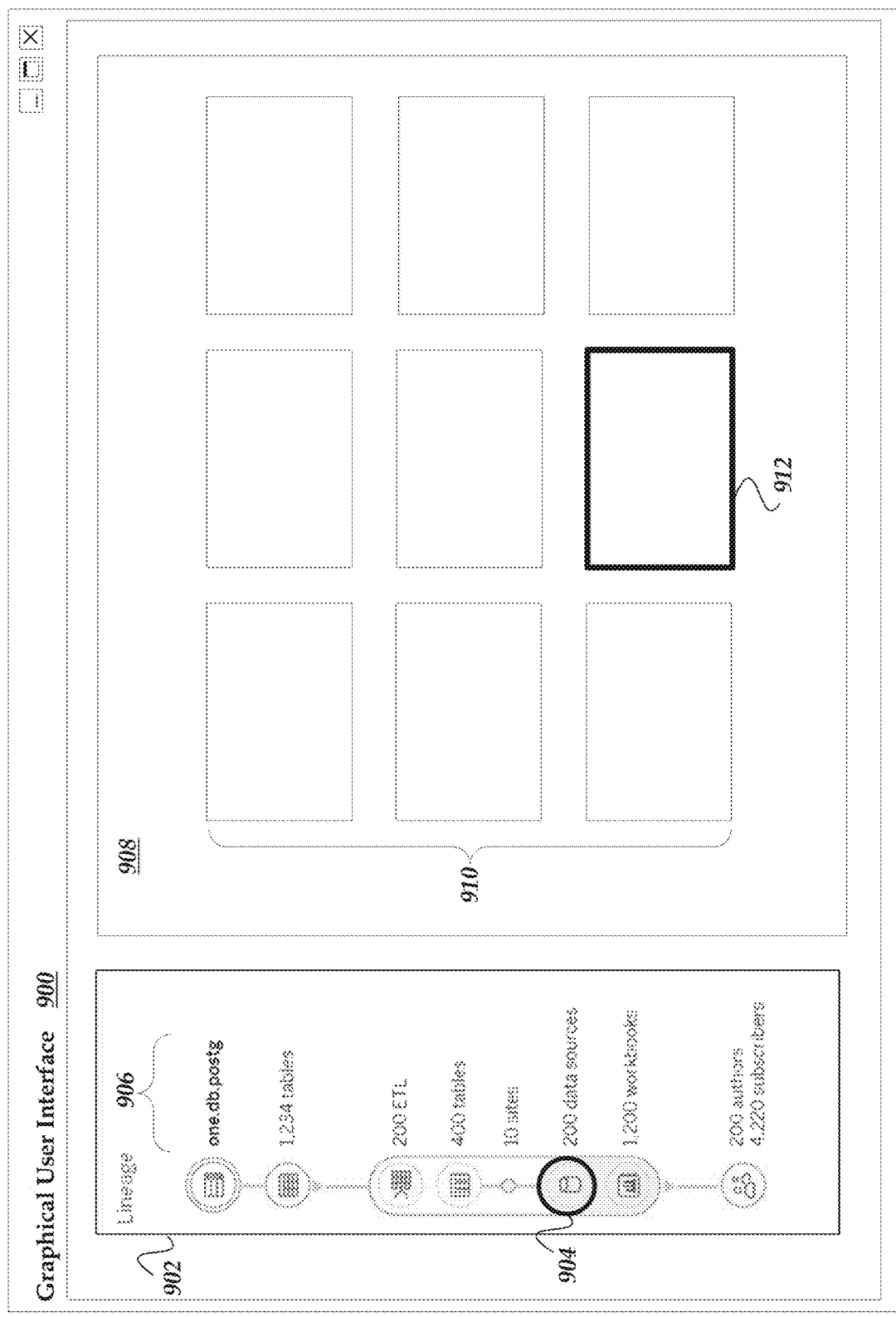
FIG. 9 illustrates a logical schematic of a portion of a user interface for an interactive lineage analyzer for data assets in accordance with one or more of the various embodiments.

FIG. 9 illustrates a logical schematic of a portion of user interface 900 for an interactive lineage analyzer for data assets in accordance with one or more of the various embodiments. In some embodiments, if a lineage object may be activated, a lineage engine may be arranged to determine some or all of the data objects that may be associated with the data model layer that may correspond to the activated lineage object. Accordingly, in some embodiments, an anchor data object may be selected or otherwise determined from these data objects. Thus, in some embodiments, if an anchor data object is determined, the lineage engine may execute a lineage analysis based on the anchor data object.

In this example, user interface 900 may be arranged to display lineage model in lineage panel 902. Accordingly, in some embodiments, lineage panel 902 may be arranged to display one or more lineage objects, such as, lineage object 904. Also, in some embodiments, the lineage objects associated lineage panel 902 may be displayed with some or all of the lineage information that may be associated the data objects associated with the data model layer that corresponds to a given lineage object. In this example, lineage object 904 is illustrated using bold weight lines to indicate that is activated.

Further, in one or more of the various embodiments, lineage information about lineage objects, such as, lineage information 906 may be displayed with a lineage model. In this example, lineage information 906 is displayed adjacent or otherwise near a corresponding lineage object. As described above, lineage information may include information associated with the data model layer or data objects that may be associated with a lineage object. In this example, lineage information include basic information, such as, names, labels, data object counts, or the like. In one or more of the various embodiments, lineage engines may be arranged to determine the lineage information to display based on defaults or user preferences obtained from configuration information.

In some embodiments, lineage analysis user interfaces, such as, user interface 900 may be arranged to include an object panel, such as, object panel 908. In some embodiments, object panels may be arranged to display data objects that may be associated with one or more data model layers. Accordingly, in some embodiments, if a lineage object may be activated, lineage engines may be arranged to determine one or more data objects that may be associated with the data model layer associated with the activated lineage object so they may be displayed in an object panel, such as, object panel 908.

In this example, objects 910 represents some or all of the data objects that may be associated with an activated lineage object, such as, lineage object 904. In some embodiments, there may be many data objects associated with lineage object or data model layer. So, in some embodiments, panel 908 may be arranged to include user interface controls for scrolling, paging, or the like, to manage display of data objects. Further, in some embodiments, the set of data objects that are displayed may be influenced by one or more filters, restrictions, or the like, that may reflect user preferences, system-wide configurations, or the like, that may be obtained from configuration information.

In one or more of the various embodiments, as described above, activated lineage objects may correspond to a data model layer that corresponds to a data object class. However, in some embodiments, one or more data model layers may be associated with many data objects. Accordingly, in some embodiments, one or more of the data objects may be designated as anchor data objects. For example, if objects 906 represent some or all of the data sources in a data model, data object 912 may represent the designated anchor data object.

In one or more of the various embodiments, lineage engines may be arranged to employ the activated lineage object and the designated anchor data object to perform lineage analysis that may include a search of the data model to determine one or more dependencies between or among data objects in the data model.

Generalized Operations

Figure 10:
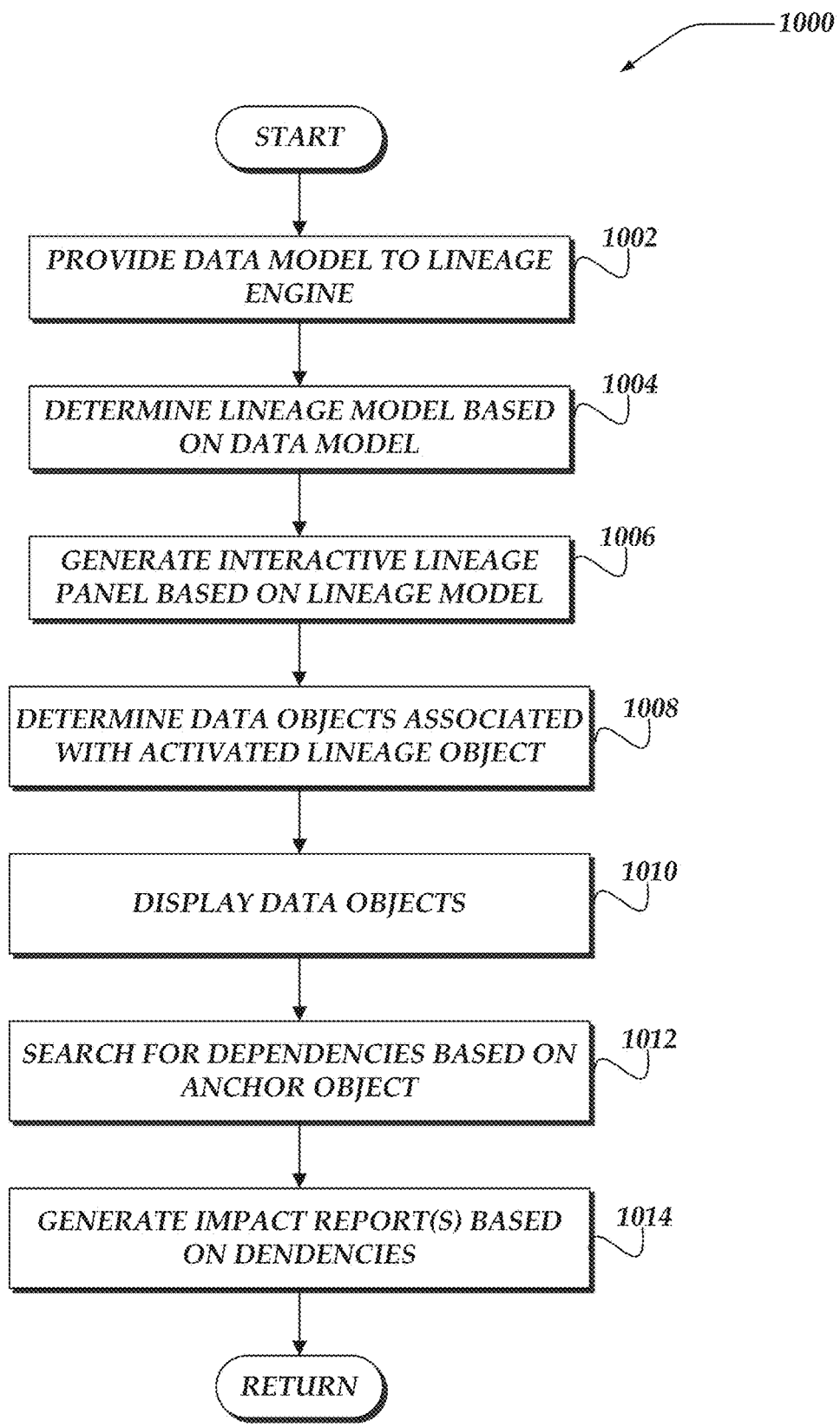
FIG. 10 illustrates an overview flowchart of a process for interactive lineage analysis of data assets in accordance with one or more of the various embodiments.
Figure 11:
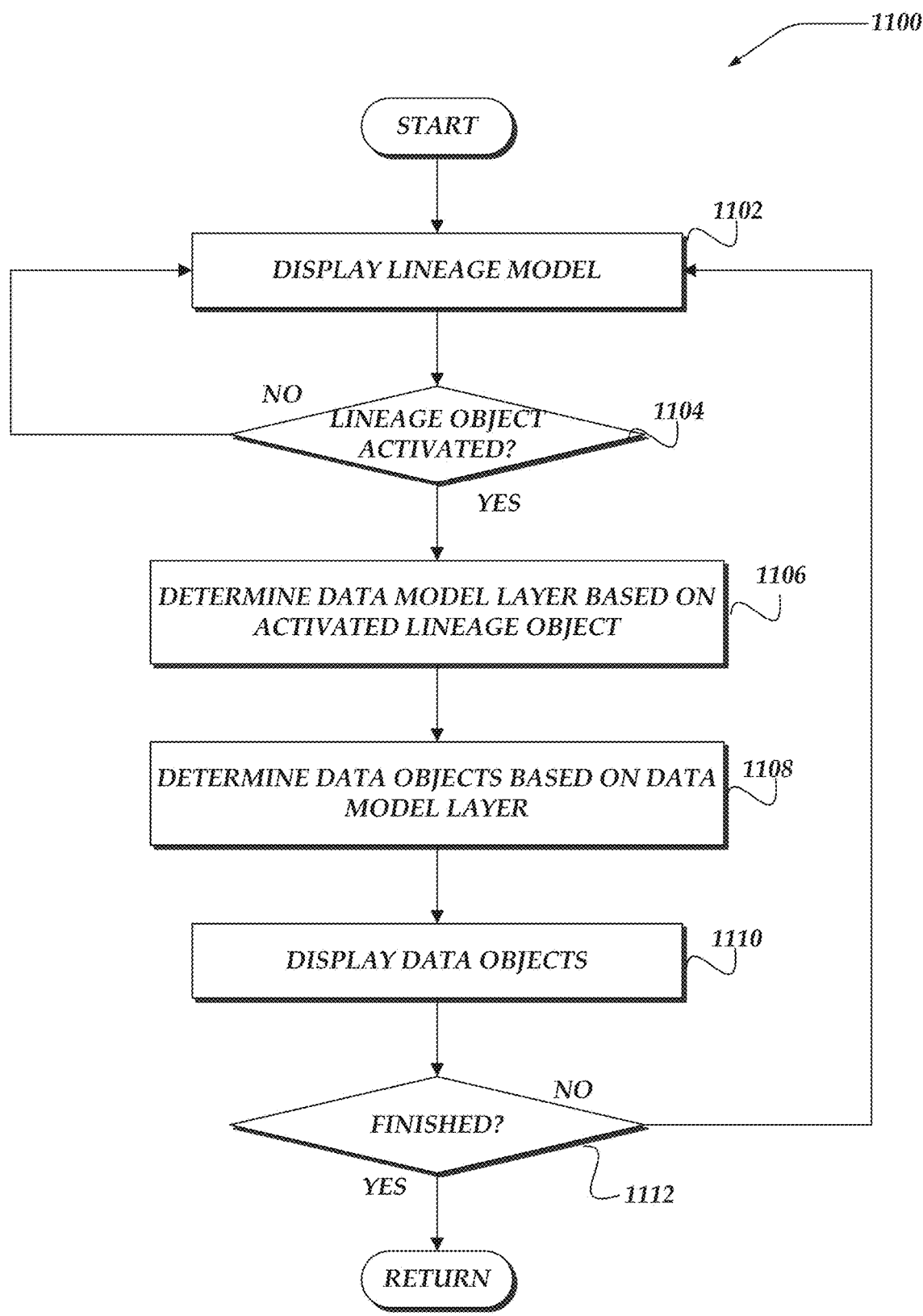
FIG. 11 illustrates a flowchart of a process for interactive lineage analysis of data assets in accordance with one or more of the various embodiments.
Figure 12:
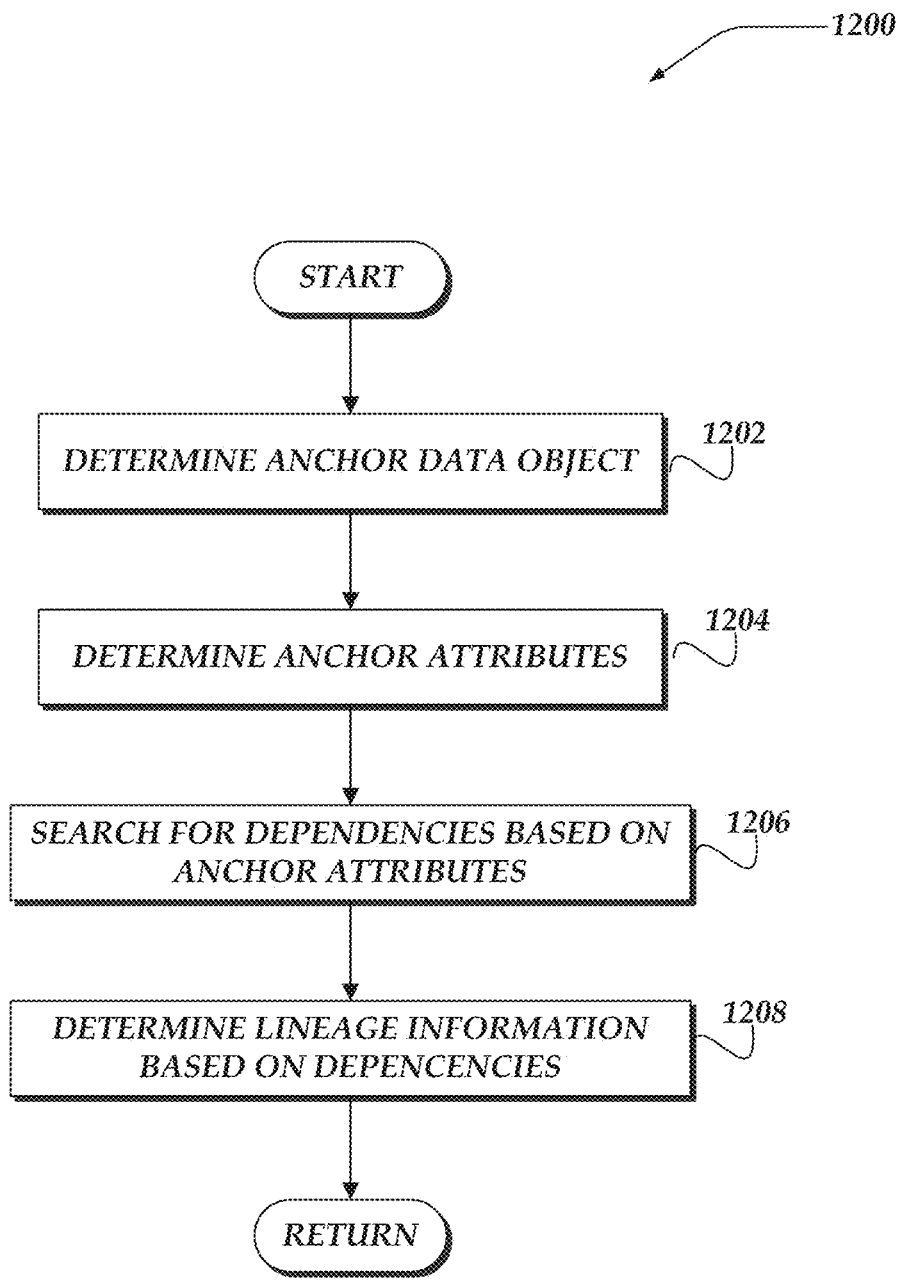
FIG. 12 illustrates a flowchart of a process for determining dependencies for interactive lineage analysis of data assets in accordance with one or more of the various embodiments.

FIGS. 10-12 represent generalized operations for interactive lineage analysis of data assets in accordance with one or more of the various embodiments. In one or more of the various embodiments, processes 1000, 1100, and 1200 described in conjunction with FIGS. 10-12 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 10-12 may be used for interactive lineage analysis of data assets in accordance with at least one of the various embodiments or architectures such as those described in conjunction with FIGS. 4-9. Further, in one or more of the various embodiments, some or all of the actions performed by processes 800, 900, and 1000 may be executed in part by data management engine 322, display engine 324, or lineage engine 326 running on one or more processors of one or more network computers.

FIG. 10 illustrates an overview flowchart of process 1000 for interactive lineage analysis of data assets in accordance with one or more of the various embodiments. After a start block, at start block 1002, in one or more of the various embodiments, a data model may be provided to a lineage engine. As described above, a data management engine, display engine, or the like, may be arranged to generate data models that may be used by visualization authors or data administrators to create data objects that may be associated with various data model layers or data object class in the data model.

At block 1004, in one or more of the various embodiments, the lineage engine may be arranged to determine a lineage model based on the data model. In one or more of the various embodiments, lineage engines may be arranged to investigate the characteristics of data model by performing various actions, such as, scanning the data model, examining schema information, executing one or more queries or searches, or the like. In some embodiments, lineage engines may be arranged to determine the information for generating a lineage model from configuration information, or the like.

At block 1006, in one or more of the various embodiments, the lineage engine may be arranged to display the lineage model in an interactive lineage panel. As described above, a display engine may generate a user interface that include the interactive lineage panel.

At block 1008, in one or more of the various embodiments, the lineage engine may be arranged to determine one or more data objects that may be associated with an activated lineage object. In one or more of the various embodiments, lineage engines may be arranged to perform a search of the data model to determine one or more data objects associated with the activated lineage object. In some embodiments, the search may include a direct traversal of the data model. In other embodiments, lineage engines may be arranged to execute a query on a databases that may be storing the data model. For example, in some embodiments, if a data model is stored in a graph-based database, searches may be performed by executing a graphQL or graphQL-like query to determine the one or more data objects associated with an activated lineage object.

At block 1010, in one or more of the various embodiments, a display engine may be arranged to display the one or more data objects in an object panel.

At block 1012, in one or more of the various embodiments, the lineage engine may be arranged to search the data model to determine or trace dependencies that may be associated with one or more designated anchor data objects.

At block 1014, in one or more of the various embodiments, the lineage engine may be arranged to generate one or more impact reports that include information associated with the determined dependencies. For example, if a data administrator is evaluating the impact associated with a particular modification to data object in data model, an impact report may include a list of the data objects that may be impacted by the impending modifications.

Also, in some embodiments, an impact report may be arranged to include contact information for one or more users that may be impacted by the modification. For example, a visualization server computer may be arranged to maintain an association of which users may be responsible or otherwise depend on one or more sheets or workbooks in a data model. In some embodiments, user relationships to data objects may be included in the data model.

In one or more of the various embodiments, an impact report may include automatically providing notifications to users about the impact of a modification to the data model.

Next, in one or more of the various embodiments, control may be returned to a calling process.

FIG. 11 illustrates a flowchart of process 1100 for interactive lineage analysis of data assets in accordance with one or more of the various embodiments. After a start block, at start block 1102, in one or more of the various embodiments, a display engine may be arranged to display a lineage model in a lineage panel on a user interface. As described above, the lineage model for a data model may include one or more lineage objects that correspond to some or all of the data model layers or data object classes in a data model.

In one or more of the various embodiments, some or all of the lineage objects may be displayed in an interactive lineage panel. Accordingly, in some embodiments, a user may easily see which lineage objects correspond to which data model layer. Further, in one or more of the various embodiments, lineage panels may be arranged to display some or all of the layer information that may be associated with a lineage object, such as, layer names/labels, data object counts, or the like.

At decision block 1104, in one or more of the various embodiments, if a lineage object may be activated, control may flow to block 1106; otherwise, control may loop back to block 1102. In some embodiments, the lineage panel may be arranged to enable a user to activate a lineage object by selecting it using a touch interface, a pointing device, hot-keys, or the like.

In some embodiments, lineage engines may be arranged to restrict the activation of one or more lineage objects to authorized users. Accordingly, in some embodiments, some users may be disabled from activating some lineage objects in a lineage model. In some embodiments, lineage engines may be arranged to determine if a user is authorized to activate a given lineage object based on configuration information.

Also, in some embodiments, the lineage panel may be arranged to automatically style the appearance or limit interactivity of one or more lineage objects based on the roles or rights of a current user. For example, if a user does not have authorization to access the database layer of a data model, lineage objects that correspond to the database layer of a data model may be styled to be unresponsive to user inputs, such as, clicks, touches, hovering, or the like.

At block 1106, in one or more of the various embodiments, a lineage engine may be arranged to determine a data model layer based on the activated lineage object. As described above, lineage objects in a lineage model may be associated with a data model layer. Accordingly, in some embodiments, if a lineage object is activated the lineage engine may be arranged to determine a corresponding data model layer based on the activated lineage object. For example, in some embodiments, data structures used to represent lineage objects may include a property that stores an identifier or reference to its corresponding data model layer.

At block 1108, in one or more of the various embodiments, the lineage engine may be arranged to determine one or more data objects based on the data model layer. In some embodiments, lineage engines may be arranged to search the data model to find data objects for a particular data model layer. In some embodiments, lineage engines may be arranged to maintain one or more indexes or caches that may be employed to determine the data objects for a data model layer directly rather than having to search the data model in real-time.

Also, in one or more of the various embodiments, data models may be represented or stored in a graph-based database. Accordingly, in one or more of the various embodiments, lineage engines may be arranged to generate one or more queries using graphQL or graphQL-like instructions that may be arranged to search for data objects based on membership in a data object class or association with the data model layer that corresponds to the activated lineage object.

Further, in some embodiments, if the data model is a graph model, lineage engines may be arranged to perform the search by traversing the data model directly.

At block 1110, in one or more of the various embodiments, the display engine may be arranged to display the one or more data objects in an object panel. As described above, a display engine may be arranged to display representations of the data objects associated with the data model layer that corresponds to the activated lineage object. In some embodiments, there may be more data objects to display than may be displayed at one time. Accordingly, in some embodiments, the display engine may be arranged to provide scrolling or paging user interface controls to enable a user to browse through the data objects.

In one or more of the various embodiments, display engines may be arranged to generate object panels that include a search control that may be used to filter the data objects that may be displayed in the object panel.

In one or more of the various embodiments, lineage engines or display engines may be arranged to sort the display order of the data objects in the object panel based on a sort order that may be defined based on configuration information.

At decision block 1112, if the interactive session may be finished, control may be returned to a calling process; otherwise, control may loop back to block 1102.

In one or more of the various embodiments, the display engine and the lineage engine may be arranged to work in concert to dynamically or automatically update the appearance of the lineage panel and object panel as a user activates different lineage objects. Accordingly, in some embodiments, if some data objects are displayed after an initial activation of a lineage object, the display engine or lineage engine may immediately prepare for another lineage object to be activated. And, in some embodiments, the display engine or lineage engine may be arranged to determine and display one or more data objects in the object panel in response to one or more subsequently activated lineage objects.

In one or more of the various embodiments, process 1100 may terminate on command, returning control to a calling process.

FIG. 12 illustrates a flowchart of process 1200 for determining dependencies for interactive lineage analysis of data assets in accordance with one or more of the various embodiments. After a start block, at start block 1202, in one or more of the various embodiments, a lineage engine may be arranged to determine one or more anchor data objects. As described above, in some embodiments, lineage engines may be arranged to perform of search of the data model to determine one or more data objects that may be associated with an activated lineage object.

In one or more of the various embodiments, one or more of the data objects associated with the activated lineage object may be designated as an anchor data object. In some embodiments, lineage engines may be arranged to automatically designate anchor data objects based on rules or other criteria determined based on configuration information. In some embodiments, one or more data model layers may be associated with default anchor data objects. For example, for some embodiments, lineage engines may be configured to automatically designate an anchor data object based on one or more characteristics of the data objects, such as, age, access recency (e.g., the default may be an object that was most recently designated as an anchor object), access frequency, user preferences, or the like. In some embodiments, lineage engines may be arranged to obtain default rules for designating anchor data objects from configuration information.

In some embodiments, anchor data objects may be designated by another process or service. For example, a data management engine or display engine may be arranged to provide a reference or identifier of a data object that may be designated as an anchor data object based on various conditions, including user interactions.

Also, in one or more of the various embodiments, lineage engines may be arranged to designate an anchor data object based on input provided by a data administrator, or the like.

At block 1204, in one or more of the various embodiments, the lineage engine may be arranged to determine one or more anchor attributes that are included in the anchor data object. As described above, data objects may be arranged to include one or more attributes that may depend on one or more attributes of another data object.

In one or more of the various embodiments, lineage engines may be arranged to perform various actions to determine anchor attributes. In some embodiments, one or more data objects may have preassigned anchor attributes that may be automatically determined if the data object may be designated as an anchor data object. In some embodiments, the anchor data object may include just one attribute that may be automatically designated by the lineage engine. In some embodiments, a user may be enabled to directly select the anchor attribute from among some or all attributes of an anchor data object.

In one or more of the various embodiments, lineage engines may be arranged to automatically determine an anchor attribute based on which attribute of a data object may be associated with the longest dependency chain or path within the data model. Further, in some embodiments, lineage engines may be arranged to select an anchor attribute based on how often it may have been previously designated as an anchor attribute.

At block 1206, in one or more of the various embodiments, the lineage engine may be arranged to search the data model to determine dependency information based on the anchor attributes. Accordingly, in one or more of the various embodiments, lineage engines may be arranged to search the data model from the anchor attribute to determine which attributes may depend on other data objects in the data model.

In one or more of the various embodiments, data models may be graph models arranged such that the relationship information represented by the edges between nodes may include detail information that may identify the one or more attributes that comprise the relationship between data objects. Accordingly, in some embodiments, a data object may be dependent on another data object based on at least one attribute of the data object depending on one or more attributes of other data object.

In one or more of the various embodiments, lineage engines may be arranged to perform one or more graph traversals using conventional graph traversal methods, such as, depth first search, breadth first search, or the like.

In one or more of the various embodiments, data models may be represented using a graph-based database systems. Accordingly, in one or more of the various embodiments, lineage engines may be arranged to generate one or more queries using graphQL or graphQL-like instructions that may be arranged to search for dependent data objects based on attribute relationships of the data objects in the data model.

At block 1208, in one or more of the various embodiments, the lineage engine may be arranged to determine the lineage information that includes at least dependency information determined by the search. In one or more of the various embodiments, lineage information based on attributes dependencies may provide a refined view of the potential impacts of a change to a data model.

In some embodiments, if the proposed change is to a little-used attribute, the impact of the change may be less than what it would appear to be if the lineage analysis was limited to object level dependencies. For example, in some embodiments, even though a table data object has relationships with many descendant data objects, it may be that only a few of the descendant data objects actually depend on the one or more of the attributes being considered for modification. Thus, in some embodiments, the attribute dependency information may provide a more accurate view of the impacts associated with a modification that is under consideration.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiment, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing data using a computer that includes one or more processors, wherein each step of the method is performed by the one or more processors, comprising:
providing a lineage model that includes one or more lineage objects, wherein the one or more lineage objects are each associated with one of one or more data model layers of a data model that includes a plurality of data objects;
activating one of the one or more lineage objects based on an association with a data model layer;
determining a first portion of the plurality of data objects based on the data model and the activated lineage object, wherein the first portion of data objects and the activated lineage object are associated with a same data model layer;
determining an anchor data object from the first portion of data objects based on one or more characteristics of the first portion of data objects;
generating a user interface that includes a lineage panel and an object panel;
displaying, in the lineage panel, the lineage model and the one or more lineage objects;
displaying, in the object panel, the first portion of the data objects;
determining another activated lineage object based on one or more inputs to the lineage panel;
determining another portion of the plurality of data objects based on the other activated lineage object, wherein the other portion of the data objects is displayed in the object panel; and
employing geolocation information to select one or more features, including a time zone, spoken language, currency or calendar format, wherein the one or more selected features are presented in or more of the user interface, a report, an internal process, or a database.

2. The method of claim 1, further comprising:
providing dependency information based on a position of the anchor data object in the data model;
determining a second portion of the plurality data objects based on the dependency information; and
presenting a list of the second portion of data objects or the dependency information to a user, wherein the presentation includes the one or more selected features in the one or more of the user interface, the report, the internal process or the database.

3. The method of claim 1, wherein determining the dependency information further comprises employing results of a search of the data model.

4. The method of claim 1, wherein determining the dependency information, further comprises:
   determining one or more attributes that are associated with the anchor data object;
   searching the data model based on the one or more attributes and one or more other attributes that are associated with the plurality of data objects in the data model; and
   providing the dependency information based on one or more associations or the one or more attributes and the one or more other attributes.

5. The method of claim 1, further comprising:
   including, in the data model, one or more user relationships to one or more of the plurality of data objects; and
   in response to one or more modifications to the data model, employing the one or more user relationships to provide one or more notifications to one or more users.

6. The method of claim 1, further comprising:
   in response to a modification to one or more of the plurality of data objects, performing further actions, including:
   determining the activated lineage object based on the one or more modified data objects;
   determining the anchor data object based on the one or more modified data objects;
   determining one or more users that are associated the modification based on the dependency information, wherein each user is associated with one or more data objects that are impacted by the modification; and
   providing one or more notifications to each user based on each impacted data object associated with the user.

7. The method of claim 1, wherein determining the second portion of the data objects, further comprises, modifying the second portion of data objects based on one or more filters, wherein the one or more filters are displayed in the lineage panel.

8. A computer readable non-transitory storage media that includes instructions for managing data, wherein execution of the instructions by one or more processors, performs actions, comprising:
   providing a lineage model that includes one or more lineage objects, wherein the one or more lineage objects are each associated with one of one or more data model layers of a data model that includes a plurality of data objects;
   activating one of the one or more lineage objects based on an association with a data model layer;
   determining a first portion of the plurality of data objects based on the data model and the activated lineage object, wherein the first portion of data objects and the activated lineage object are associated with a same data model layer;
   determining an anchor data object from the first portion of data objects based on one or more characteristics of the first portion of data objects;
   generating a user interface that includes a lineage panel and an object panel;
   displaying, in the lineage panel, the lineage model and the one or more lineage objects;
   displaying, in the object panel, the first portion of the data objects;
   determining another activated lineage object based on one or more inputs to the lineage panel;
   determining another portion of the plurality of data objects based on the other activated lineage object, wherein the other portion of the data objects is displayed in the object panel; and
   employing geolocation information to select one or more features, including a time zone, spoken language, currency or calendar format, wherein the one or more selected features are presented in or more of the user interface, a report, an internal process, or a database.

9. The media of claim 8, further comprising:
   providing dependency information based on a position of the anchor data object in the data model;
   determining a second portion of the plurality data objects based on the dependency information; and
   presenting a list of the second portion of data objects or the dependency information to a user, wherein the presentation includes the one or more selected features in the one or more of the user interface, the report, the internal process or the database.

10. The media of claim 8, wherein determining the dependency information further comprises employing results of a search of the data model.

11. The media of claim 8, wherein determining the dependency information, further comprises:
    determining one or more attributes that are associated with the anchor data object;
    searching the data model based on the one or more attributes and one or more other attributes that are associated with the plurality of data objects in the data model; and
    providing the dependency information based on one or more associations or the one or more attributes and the one or more other attributes.

12. The media of claim 8, further comprising:
    including, in the data model, one or more user relationships to one or more of the plurality of data objects; and
    in response to one or more modifications to the data model, employing the one or more user relationships to provide one or more notifications to one or more users.

13. The media of claim 8, further comprising:
    in response to a modification to one or more of the plurality of data objects, performing further actions, including:
    determining the activated lineage object based on the one or more modified data objects;
    determining the anchor data object based on the one or more modified data objects;
    determining one or more users that are associated the modification based on the dependency information, wherein each user is associated with one or more data objects that are impacted by the modification; and
    providing one or more notifications to each user based on each impacted data object associated with the user.

14. The media of claim 8, wherein determining the second portion of the data objects, further comprises, modifying the second portion of data objects based on one or more filters, wherein the one or more filters are displayed in the lineage panel.

15. A system for managing data over a network, comprising:
    a network computer, including:
    a memory that stores at least instructions; and
    one or more processors that execute instructions that perform actions, comprising:

providing a lineage model that includes one or more lineage objects, wherein the one or more lineage objects are each associated with one of one or more data model layers of a data model that includes a plurality of data objects;

activating one of the one or more lineage objects based on an association with a data model layer;

determining a first portion of the plurality of data objects based on the data model and the activated lineage object, wherein the first portion of data objects and the activated lineage object are associated with a same data model layer;

determining an anchor data object from the first portion of data objects based on one or more characteristics of the first portion of data objects;

generating a user interface that includes a lineage panel and an object panel;

displaying, in the lineage panel, the lineage model and the one or more lineage objects;

displaying, in the object panel, the first portion of the data objects;

determining another activated lineage object based on one or more inputs to the lineage panel;

determining another portion of the plurality of data objects based on the other activated lineage object, wherein the other portion of the data objects is displayed in the object panel; and employing geolocation information to select one or more features, including a time zone, spoken language, currency or calendar format, wherein the one or more selected features are presented in or more of the user interface, a report, an internal process, or a database; and a client computer, comprising:
  a memory that stores at least instructions; and
  one or more processors that execute instructions that perform actions, including:
    receiving the report.

16. The system of claim 15, further comprising:
providing dependency information based on a position of the anchor data object in the data model;
determining a second portion of the plurality data objects based on the dependency information; and
presenting a list of the second portion of data objects or the dependency information to a user, wherein the presentation includes the one or more selected features in the one or more of the user interface, the report, the internal process or the database.

17. The system of claim 15, wherein determining the dependency information further comprises employing results of a search of the data model.

18. The system of claim 15, wherein determining the dependency information, further comprises:
determining one or more attributes that are associated with the anchor data object;
searching the data model based on the one or more attributes and one or more other attributes that are associated with the plurality of data objects in the data model; and
providing the dependency information based on one or more associations or the one or more attributes and the one or more other attributes.

19. The system of claim 15, further comprising:
including, in the data model, one or more user relationships to one or more of the plurality of data objects; and
in response to one or more modifications to the data model, employing the one or more user relationships to provide one or more notifications to one or more users.

20. The system of claim 15, further comprising:
in response to a modification to one or more of the plurality of data objects, performing further actions, including:
determining the activated lineage object based on the one or more modified data objects;
determining the anchor data object based on the one or more modified data objects;
determining one or more users that are associated the modification based on the dependency information, wherein each user is associated with one or more data objects that are impacted by the modification; and
providing one or more notifications to each user based on each impacted data object associated with the user.

* * * * *